United States Patent
Kuramitsu et al.

(10) Patent No.: US 8,261,343 B2
(45) Date of Patent: Sep. 4, 2012

(54) PROCESSING OF CONTENT WITH RIGHTS ASSOCIATED PRIORITY INFORMATION BASED ON CONDITIONS

(75) Inventors: Mami Kuramitsu, Hiroshima (JP); Hideki Fujimori, Hiroshima (JP); Futoshi Nakabe, Hiroshima (JP)

(73) Assignee: Panasonic Corporation, Osaka (JP)

( * ) Notice: Subject to any disclaimer, the term of this patent is extended or adjusted under 35 U.S.C. 154(b) by 531 days.

(21) Appl. No.: 12/517,106

(22) PCT Filed: Apr. 11, 2008

(86) PCT No.: PCT/JP2008/000951
§ 371 (c)(1),
(2), (4) Date: Jun. 1, 2009

(87) PCT Pub. No.: WO2008/132798
PCT Pub. Date: Nov. 6, 2008

(65) Prior Publication Data
US 2010/0070604 A1  Mar. 18, 2010

(30) Foreign Application Priority Data
Apr. 16, 2007  (JP) ................................ 2007-107465

(51) Int. Cl.
*G06F 21/24* (2006.01)
*H04L 12/24* (2006.01)

(52) U.S. Cl. ............................. 726/18; 726/6; 713/161

(58) Field of Classification Search .................. None
See application file for complete search history.

(56) References Cited

U.S. PATENT DOCUMENTS

| 5,291,596 | A * | 3/1994 | Mita ..................................... 1/1 |
| 6,360,296 | B1 * | 3/2002 | Kubota et al. ................. 711/113 |
| 2002/0002466 | A1 | 1/2002 | Kambayashi et al. |
| 2003/0004888 | A1 | 1/2003 | Kambayashi et al. |
| 2003/0101142 | A1 | 5/2003 | Kambayashi et al. |
| 2004/0162846 | A1 * | 8/2004 | Nakahara et al. ............. 707/102 |
| 2005/0289229 | A1 * | 12/2005 | Kim ............................ 709/223 |

(Continued)

FOREIGN PATENT DOCUMENTS

JP 11-283327 10/1999

(Continued)

OTHER PUBLICATIONS

International Search Report issued Jul. 29, 2008 in the International (PCT) Application of which the present application is the U.S. National Stage.

(Continued)

*Primary Examiner* — Venkat Perungavoor
(74) *Attorney, Agent, or Firm* — Wenderoth, Lind & Ponack, L.L.P.

(57) ABSTRACT

A mobile terminal apparatus is provided to process a copyright-protected content based on rights that permit the processing of the content. The mobile terminal apparatus includes a priority information selecting unit selecting a piece of priority information associated with one of many processing conditions for the content to be processed, from among pieces of priority information for determining a priority for each of the rights. The mobile terminal apparatus also includes a right selecting unit determining a priority of each of the rights based on the selected piece of priority information, and selecting a right having a highest priority among the rights, according to the determined priority. The mobile terminal apparatus also includes a content processing unit processing the content based on the selected right.

9 Claims, 15 Drawing Sheets

U.S. PATENT DOCUMENTS

| | | |
|---|---|---|
| 2006/0106769 A1 | 5/2006 | Gibbs |
| 2006/0229990 A1 | 10/2006 | Shimoji et al. |
| 2007/0094666 A1* | 4/2007 | Ode .............................. 718/104 |
| 2007/0150967 A1 | 6/2007 | Takahashi |

FOREIGN PATENT DOCUMENTS

| | | |
|---|---|---|
| JP | 2004-240960 | 8/2004 |
| JP | 2004-348384 | 12/2004 |
| JP | 2005-004350 | 1/2005 |
| WO | 2005/050509 | 6/2005 |
| WO | 2005/052831 | 6/2005 |
| WO | 2006/055120 | 5/2006 |

OTHER PUBLICATIONS

Full Machine Translation of JP 2004-348384, which was previously cited in the Information Disclosure Statement filed on Jun. 1, 2009.

* cited by examiner

FIG. 5A

Priority level: High ←→ Low

| | | | |
|---|---|---|---|
| 401 — Remaining validity period | Long | Short | Same |
| 402 — Remaining reproduction count | Many | Few | Same |
| 403 — Remaining reproduction time | Long | Short | Same |

FIG. 5B

First priority information — 213a

| | | | | | | | |
|---|---|---|---|---|---|---|---|
| 401 — Remaining validity period | Long | Short | Same or None | | | | |
| 403 — Remaining reproduction time | ///// | ///// | Long | Short | Same or None | | |
| 402 — Remaining reproduction count | ///// | ///// | ///// | ///// | Many | Few | Same |
| Priority level | ① | ② | ③ | ④ | ⑤ | ⑥ | ⑦ |

High ←→ Low Priority level

FIG. 5C

Second priority information — 213b

| | | | | | | | |
|---|---|---|---|---|---|---|---|
| 401 — Remaining validity period | Long | Short | Same or None | | | | |
| 402 — Remaining reproduction count | ///// | ///// | Many | Few | Same or None | | |
| 403 — Remaining reproduction time | ///// | ///// | ///// | ///// | Long | Short | Same |
| Priority level | ① | ② | ③ | ④ | ⑤ | ⑥ | ⑦ |

High ←→ Low Priority level

| Condition type | Condition | Priority information |
|---|---|---|
| Reproduction purpose | User reproduction | Second priority information |
| | Incoming-message alert data | First priority information |
| | Previewing | First priority information |
| | Wake-up image | First priority information |

| Condition type | Condition | Priority information |
|---|---|---|
| Content type | Image | First priority information |
| | Music | Second priority information |
| | Video | Second priority information |

| Condition type | Condition | | Priority information |
|---|---|---|---|
| Reproduction purpose + Reproduction time | User reproduction | Reproduction time ≤ Set time | First priority information |
| | | Reproduction time > Set time | Second priority information |
| | Incoming-message alert data | | First priority information |

FIG. 13

| Condition | Priority information | |
|---|---|---|
| User reproduction | ☐ Reproduction time prioritized | ☑ Reproduction count prioritized |
| Incoming-message alert data | ☑ Reproduction time prioritized | ☐ Reproduction count prioritized |

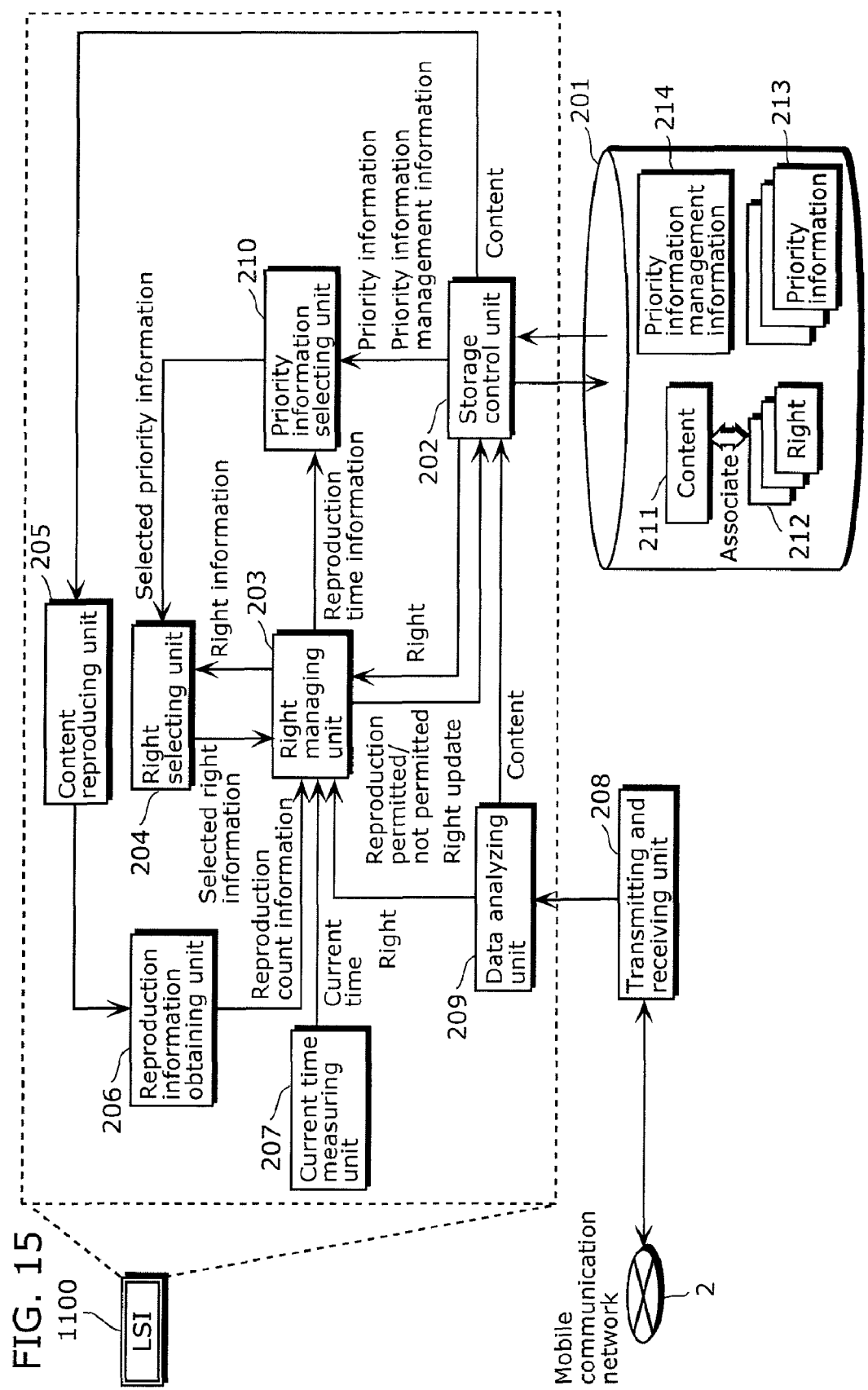

PROCESSING OF CONTENT WITH RIGHTS ASSOCIATED PRIORITY INFORMATION BASED ON CONDITIONS

TECHNICAL FIELD

The present invention relates to a terminal apparatus, a right priority judging method, a program, and an integrated circuit, and particularly to a terminal apparatus which processes a content based on plural rights permitting the processing of the content up to a predetermined range.

BACKGROUND ART

As commonly known, apparatuses including a function (hereafter referred to as communication function) enabling communication through connection to a network such as the Internet are widely used as mobile terminal apparatuses such as a mobile phone.

Such mobile terminal apparatuses including a communication function can download copyright-protected content such as video and music from a content provider and reproduce the downloaded content.

Normally, the reproduction of a copyright-protected content requires a right corresponding to the content. The right specifies a validity period for reproducing the content, and the content can be reproduced only within this validity period.

FIG. 1 is a diagram conceptually showing a service concerning the downloading and reproduction of a copyright-protected content.

A content distributing company 1 holds a content 211 to be provided and a right 212 corresponding to the content 211. The content distributing company 1 distributes the content 211 and the right 212 from a base station 3 to a mobile terminal apparatus 4. The content 211 and the right 212 are distributed via a mobile communication network 2.

The mobile terminal apparatus 4 reproduces the content only within the validity period specified by the right 212 within the mobile terminal apparatus 4.

In the above service, there are cases where there is one right 212 corresponding to one content 211, and there are cases where there are plural rights. For example, there is the case where a right purchased by a user, a right received by the user as a donation from someone else, and a charge-free right for previewing and the like, are present as plural rights corresponding to one content 211.

Patent Reference 1 discloses a technique which allows a user the most efficient reproduction of the content 211 in reproducing the copyright-protected content 211 when plural rights 212 corresponding to one content 211 are present within the mobile terminal apparatus 4.

The technique disclosed in Patent Reference 1 determines, according to a predetermined priority level, a right 212 to be used in reproducing the content 211 when plural rights 212 are present within the mobile terminal apparatus 4.

With this, for example, when the validity period and the number of reproductions are specified in each of the plural rights 212, the user is able to reproduce the content 211 for the longest period and for the most number of times. Furthermore, when the validity period and the reproduction time are specified in each of the plural rights 212, the user is able to reproduce the content 211 for the longest period. In addition, when the reproduction period and the number of reproductions are specified in each of the plural rights 212, the user is able to reproduce the content 211 for the longest period and for the most number of times.

Patent Reference 1: Japanese Unexamined Patent Application Publication No. 2004-348384

DISCLOSURE OF INVENTION

Problems that Invention is to Solve

However, in the technique disclosed in Patent Reference 1, the judging procedure for priority is fixed, and thus, depending on the type, purpose of reproduction, or reproduction status of the content 211, there are cases where optimal judgment cannot be performed.

For example, there is a significant difference in reproduction time between reproducing distributed music content as is and using the music content as incoming-message alert data for e-mail or phone calls. Furthermore, when reproducing music content, there are cases where the user suspends the reproduction due to a phone call or urgent business.

In such a case, when the priority level in priority information is fixed, such as when the remaining number of reproductions of a right is always prioritized over the remaining reproduction time, there is a chance that the user will be unable to reproduce the music content for the longest period and for the most number of times.

Consequently, the present invention has as an object to provide a terminal apparatus, a right priority judging method, a program, and an integrated circuit that enable the use of the optimal right among plural rights.

Means to Solve the Problems

In order to achieve the aforementioned object, the terminal apparatus according to the present invention is a terminal apparatus which processes a content based on plural rights that permit the processing of the content, the terminal apparatus including: a priority information selecting unit which selects a piece of priority information associated with a processing condition for the content to be processed, from among pieces of priority information for determining priority for each of the plural rights; a right selecting unit which determines the priority of each of the plural rights using the selected piece of priority information, and selects a right having highest priority among the plural rights, according to the determined priority; and a content processing unit processes the content based on the selected right.

According to this configuration, the terminal apparatus in the present invention selects, at the time of content processing, the piece of priority information corresponding to the processing condition for the content from among the pieces of priority information, and selects the right to be used in the content processing, from among the plural rights, according to the selected priority information. Specifically, unlike the conventional technique which selects a right according to a fixed priority, the terminal apparatus in the present invention selects a right according to a different priority, depending on the processing condition for the content.

With this, the terminal apparatus in the present invention can process the content based on the right that is most advantageous for the user. In other words, the terminal apparatus in the present invention can process the content using the optimal right among plural rights.

It should be noted that, here, content processing refers to the reproduction of video and audio content, the display of a still image, the execution of an application program, and so on.

Furthermore, the plural rights may include a first right specifying a processing time for the content, and a second right specifying a processing count for the content, the pieces of priority information may include first priority information and second priority information, the first priority information indicating that the processing time has higher priority than the processing count, and the second priority indicating that the processing count has higher priority than the processing time, and the right selecting unit may determine that the first right has higher priority than the second right, using the first priority information, when the first priority information is selected by the priority information selecting unit, and determine that the second right has higher priority than the first right, using the second priority information, when the second priority information is selected by the priority information selecting unit.

According to this configuration, the terminal apparatus in the present invention can select whether to prioritize the processing time or to prioritize the processing count, depending on the processing condition for the content.

Furthermore, the priority information selecting unit may select the first priority information when the processing time for the content to be processed is a first processing time, and select the second priority information when the processing time for the content to be processed is a second processing time that is longer than the first processing time.

According to this configuration, the terminal apparatus in the present invention prioritizes the right specifying the processing count when the processing time for the content is long, and prioritizes the right specifying the processing time when the processing time for the content is short. With this, the user is able to process the content for the longest period and for the most number of times.

Furthermore, the processing condition for the content may be a type or a processing purpose of the content.

According to this configuration, the terminal apparatus in the present invention can select the priority of a right according to the type of the content, such as music data, video data, and still image data, or the processing purpose for the content, such as reproduction of the content as it is or using the content as e-mail or phone call incoming-message alert data.

Furthermore, the processing condition for the content may be a processing purpose of the content, and the priority information selecting unit may select the first priority information when the processing purpose of the content to be processed is for incoming-message alert data, and select the second priority information when the processing purpose of the content to be processed is reproduction according to a user operation.

According to this configuration, the terminal apparatus in the present invention preferentially selects a right including the processing time when the content is to be reproduced as incoming-message alert data for which processing time is short, and preferentially selects a right including the processing count when the content is to be reproduced according to the user, for which processing time is long. With this, the terminal apparatus in the present invention can process the content using the optimal right among plural rights.

Furthermore, the processing condition for the content may be a type of the content, and the priority information selecting unit may select the first priority information when the type of the content to be processed is still-image, and select the second priority information when the type of the content to be processed is video or audio.

According to this configuration, the terminal apparatus in the present invention preferentially selects a right including the processing time when reproducing a still image for which processing time is short, and preferentially selects a right including the processing count when reproducing audio or video for which processing time is long. With this, the terminal apparatus in the present invention can process the content using the optimal right among plural rights.

Furthermore, the terminal apparatus may further include a priority information management information generating unit which generates priority information management information indicating associations between the pieces of priority information and the processing condition for the content, wherein the priority information selecting unit may select the piece of priority information associated with the processing condition for the content to be processed, from among the pieces of priority information, according to the priority information management information.

According to this configuration, the terminal apparatus in the present invention can set the association between the processing condition of the content and the pieces of priority information.

Furthermore, the terminal apparatus may further include a user operation input unit which receives an inputted user operation, wherein the priority information management information generating unit may generate the priority information management information in response to the user operation.

According to this configuration, the user can arbitrarily set the association between the processing condition of the content and the pieces of priority information.

Furthermore, the plural rights may include a first right specifying a first processing time which is a processing time for the content, and a second right specifying a first processing count which indicates how many times the content has been processed, the pieces of priority information may include first priority information and second priority information, the first priority information indicating that the processing time has higher priority than the processing count, and the second priority indicating that the processing count has higher priority than the processing time, and the priority information management information generating unit may calculate a second processing count by dividing the first processing time by a second processing time corresponding to a first processing condition included in the processing condition of the content, compare the first processing count and the second processing count, and generate the priority information management information in which the first priority information is associated with the first processing condition, when the second processing count is greater than the first processing count, and generate the priority information management information in which the second priority information is associated with the first processing condition, when the second processing count is less than the first processing count.

According to this configuration, the terminal apparatus in the present invention can select the piece of priority information conforming to the processing time of the content, instead of selecting the piece of priority information according to the processing purpose for the content per se. With this, the terminal apparatus in the present invention can process the content using a more appropriate right.

In addition, the terminal apparatus in the present invention can dynamically generate or update the priority information management information in accordance with a newly obtained right or the state of use of a right. With this, the terminal apparatus in the present invention can use the optimal right at all times.

Furthermore, the terminal apparatus may further include a receiving unit which obtains, via a network, priority information management information indicating associations between the pieces of priority information and the processing condition for the content, wherein the priority information selecting unit may select, according to the priority information management information, the piece of priority information associated with the processing condition for the content to be processed, from among the pieces of priority information.

According to this configuration, the content distributing company can specify the association between the processing condition and the pieces of priority information, to the terminal apparatus that will process the content.

Furthermore, the priority information selecting unit may obtain a reproduction time of the content after the reproduction of the content by the content reproducing unit, and select the first priority information when the reproduction time is shorter than a predetermined set time, the right selecting unit may select the first right using the first priority information, and the terminal apparatus may further include a right updating unit which updates the first right according to a state of the reproduction of the content by the content reproducing unit.

According to this configuration, in the case where the reproduction time for the content becomes shorter than planned, for example, in the case where, during the reproduction of music content, the user stops the reproduction due to a phone call or urgent business, the terminal apparatus in the present invention selects, after content reproduction, the first priority information which prioritizes the processing time over the processing count. With this, the terminal apparatus in the present invention can process the content in the state that is most advantageous to the user.

Furthermore, the priority information selecting unit may select the second priority information prior to the reproduction of the content by the content reproducing unit, the right selecting unit may select the second right using the second priority information, the content processing unit may process the content based on the selected second right, the right updating unit may update the second right according to a state of the reproduction of the content by the content reproducing unit, the priority information selecting unit may re-select the first priority information after the reproduction of the content, when a reproduction time for the reproduction of the content by the content reproducing unit is shorter than the set time, the right selecting unit may re-select the first right using the first priority information, and the right updating unit may update the first right and restore the second right to a state prior to being updated, according to the state of the reproduction of the content by the content reproducing unit.

According to this configuration, the right managing unit updates the re-determined right and restores the right that was determined prior to the processing of the content to the state prior to being determined. Thus, after the processing of the content, problems do not particularly occur even when the right that is used is changed.

Furthermore, the right priority judging method according to the present invention is a right priority judging method for use with a terminal apparatus which processes a content based on plural rights that permit the processing of the content, the method including: selecting a piece of priority information associated with a processing condition for the content to be processed, from among pieces of priority information for determining priority for each of the plural rights; determining the priority of each of the plural rights using the selected piece of priority information, and selecting a right having highest priority among the plural rights, according to the determined priority; and processing the content based on the selected right.

With this, the right priority judgment method in the present invention selects, at the time of content processing, the piece of priority information associated with the processing condition for the content from among the pieces of priority information, and selects the right to be used in the content processing, from among the plural rights, according to the selected priority information. Specifically, unlike the conventional technique which selects a right according to a fixed priority, the right priority judgment method in the present invention selects a right according to a different priority, depending on the processing condition for the content.

With this, the right priority judgment method in the present invention enables processing of the content based on the right that is most advantageous for the user. In other words, the right priority judgment method in the present invention enables the processing of the content using the optimal right among plural rights.

It should be noted that the present invention can be implemented, not only as terminal apparatus such as that described herein, but also as a the right priority judging method having, as steps, the characteristic processing units included in such terminal apparatus, or a program causing a computer to execute such characteristic steps. In addition, it goes without saying that such a program can be distributed via a recording medium such as a CD-ROM and via a transmitting medium such as the Internet. In addition, the present invention can be implemented as an integrated circuit that implements a part or all of the functions of the terminal apparatus.

Effects of the Invention

As described above, the present invention can provide a terminal apparatus, a right priority judging method, a program, and an integrated circuit that enable the use of the optimal right among plural rights.

BRIEF DESCRIPTION OF DRAWINGS

FIG. 5A is a diagram conceptually showing the priority level of rights in the mobile terminal apparatus in the first embodiment of the present invention.

FIG. 5B is diagram showing an example of the structure of first priority information in the first embodiment of the present invention.

FIG. 5C is a diagram showing an example of the structure of second priority information in the first embodiment of the present invention.

FIG. 6A is a diagram showing the structure of priority information management in the first embodiment of the present invention.

FIG. 6B is diagram showing the structure of a modification of the priority information management information in the first embodiment of the present invention.

FIG. 6C is diagram showing the structure of a modification of the priority information management information in the first embodiment of the present invention.

FIG. 13 is a diagram showing an example of a user operation screen in the mobile terminal apparatus in the third embodiment of the present invention.

FIG. 15 is a diagram showing the configuration of an integrated circuit in the present invention.

NUMERICAL REFERENCES

Figure 1:
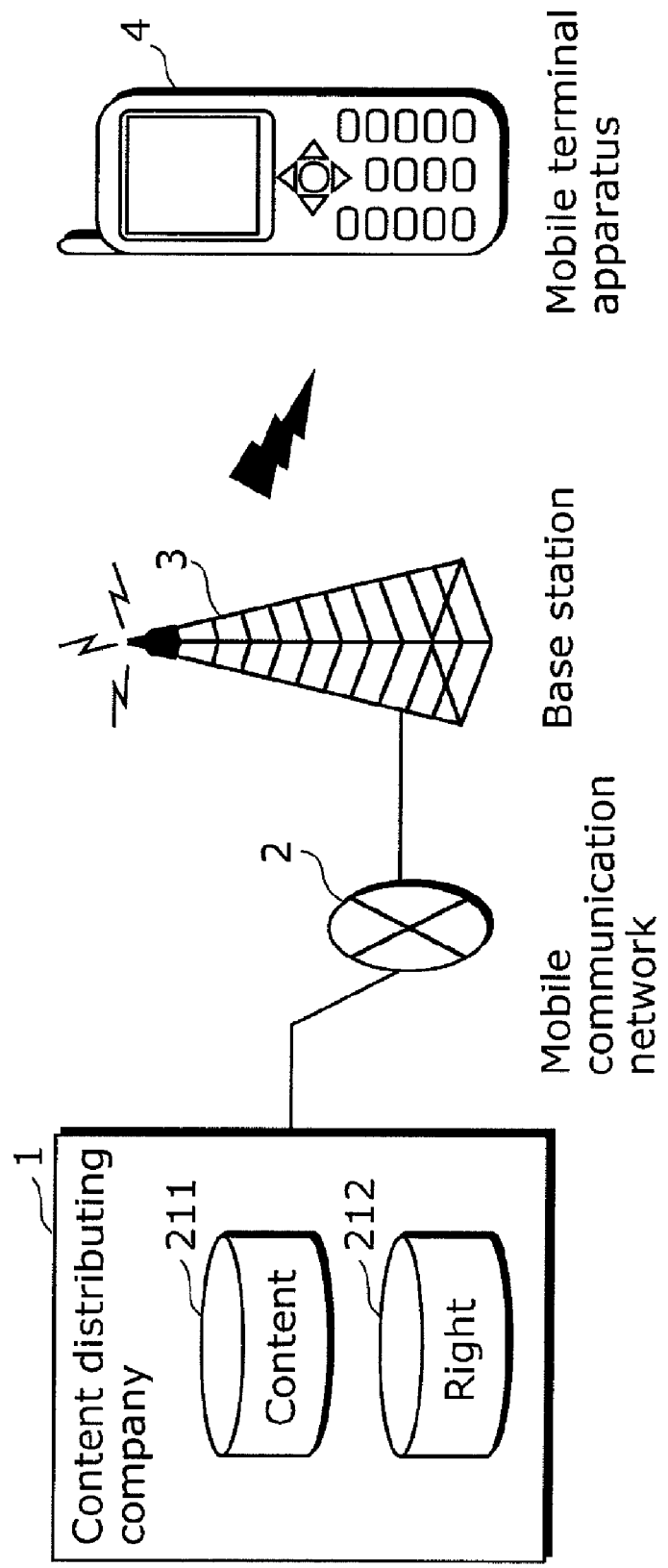
FIG. 1 is a diagram showing the outline configuration of a content distribution service using a mobile terminal apparatus in a first embodiment of the present invention.

1 Content distributing company
2 Mobile communication network
3 Base station
4 Mobile terminal apparatus
201 Storage unit
202 Storage control unit
203 Right managing unit
204 Right selecting unit
205 Content reproducing unit
206 Reproduction information obtaining unit
207 Current time measuring unit
208 Transmitting and receiving unit
209 Data analyzing unit
210 Priority information selecting unit
211 Content
212, 212a, 212b Right
213 Priority information
213a First priority information
213b Second priority information
214, 214a, 214b Priority information management information
215, 217 Priority information management information generating unit
216 User operation input unit
300 Right information
301 Reproduction permitted/not permitted flag
302 Validity period
302a Start time
302b End time
303 Reproduction count
303a Reproduction count
303b set count
304 Reproduction time
304a Reproduction time
304b Set time
305 Time-specified-reproduction count
305a Specified time
305b Reproduction count
305c Set count
401 Remaining validity period
402 Remaining reproduction count
403 Remaining reproduction time
1100 LSI

BEST MODE FOR CARRYING OUT THE INVENTION

First Embodiment

A terminal apparatus in a first embodiment of the present invention shall be described with reference to FIG. 1 to FIG. 8.

The terminal apparatus in the first embodiment of the present invention stores pieces of priority information indicating priorities for determining a right to be used in reproducing a content, among plural rights, and selects a piece of priority information according to a reproduction condition for the content. With this, the terminal apparatus in the first embodiment of the present invention can use the optimal right among the plural rights.

First, the configuration of the terminal apparatus in the first embodiment of the present invention shall be described.

The conceptual image of the service concerning the downloading and reproduction of the copyright-protected content 211 is the same as in FIG. 1.

The content distributing company 1 holds the content 211 to be provided and the right 212 corresponding to the content 211. The content distributing company 1 distributes the content 211 and the right 212 from a base station 3 to the mobile terminal apparatus 4. The content 211 and the right 212 are distributed via the mobile communication network 2 such as the Internet.

The mobile terminal apparatus 4 is a terminal apparatus capable of the right priority judging according to the present invention, and reproduces the content 211 based on plural rights 212 which permit the reproduction of the content 211. Specifically, when reproducing the content 211, the mobile terminal apparatus 4 reproduces the content 211 only when conditions such as the validity period, number of reproductions, and reproduction time, specified by the right 212 stored in the mobile terminal apparatus 4 are satisfied.

The mobile terminal apparatus 4 is, for example, a mobile phone. It should be noted that the mobile terminal apparatus 4 may also be a Personal Digital Assistant (PDA), a notebook-sized personal computer, and so on.

Figure 2:
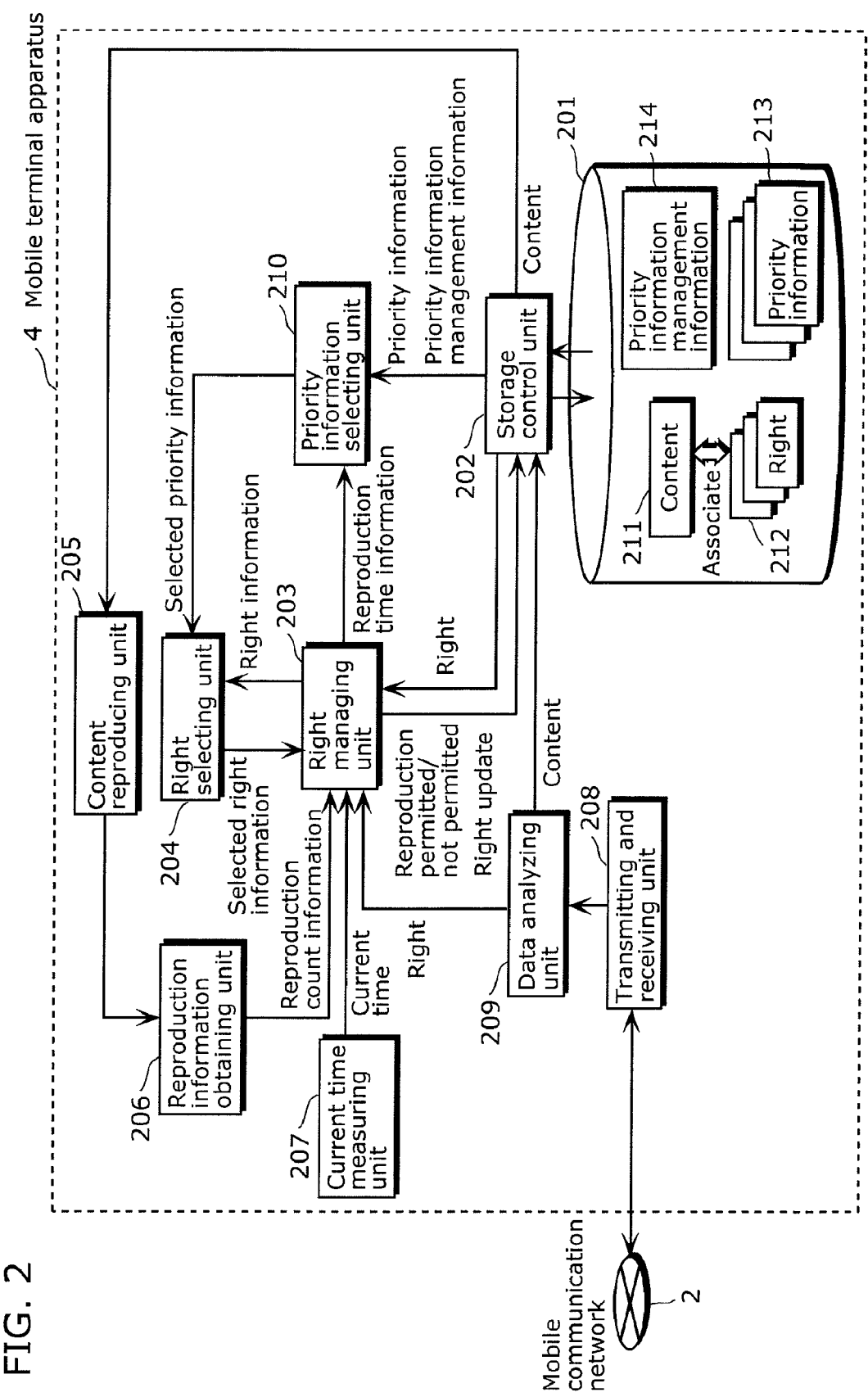
FIG. 2 is a diagram showing the configuration of the mobile terminal apparatus in the first embodiment of the present invention.

FIG. 2 is a block diagram showing the configuration outline of the right priority judgment-capable mobile terminal apparatus 4 in the first embodiment of the present invention.

The mobile terminal apparatus 4 shown in FIG. 2 includes a storage unit 201, a storage control unit 202, a right managing unit 203, a right selecting unit 204, a content reproducing unit 205, a reproduction information obtaining unit 206, a current time measuring unit 207, a transmitting and receiving unit 208, a data analyzing unit 209, and a priority information selecting unit 210.

The content 211, the plural rights 212, pieces of priority information 213, and priority information management information 214 are stored in the storage unit 201. The storage unit 201 is, for example, a Hard Disk Drive (HDD) or a non-volatile memory. It should be noted that the storing memory 201 may also be a detachable recording medium (a memory card, and the like) that can be attached to the mobile terminal apparatus 4.

The content 211 is a content distributed by the content distributing company 1. Each of the plural rights 212 is a right that permits the reproduction of the content 211 up to a predetermined range.

Each of the pieces of priority information 213 is information indicating a procedure for determining respective priorities corresponding to the plural rights 212.

The priority information management information 214 is information indicating the association between the pieces of priority information 213 and the reproduction conditions for the content 211.

The storage control unit 202 performs the writing, updating, and reading of data with respect to the storage unit 201.

The right managing unit 203 manages the right 212. Specifically, the right managing unit 203 associates a distributed right 212 and the content 211 and then stores this into the storage unit 201 via the storage control unit 202.

Furthermore, in reproducing the content 211, the right managing unit 203 judges whether the reproduction of the content 211 is permitted or not permitted, based on the plural rights 212 corresponding to the content 211. The right managing unit 203 generates right information indicating the judgment result and notifies the generated right information to the right selecting unit 204.

Furthermore, with the reproduction of the content 211, the right managing unit 203 updates a right 212 according to the reproduction status of the content 211, and stores the updated right 212 into the storage unit 201 via the storage control unit 202.

In accordance with the priority information management information 214, the priority information selecting unit 210 selects, from the pieces of priority information 213, the priority information 213 associated with the reproduction conditions for reproducing the content 211. The priority information selecting unit 210 notifies the right selecting unit 204 of the selected priority information which is the selected priority information 213.

The right selecting unit 204 determines the priority for the pieces of right information notified by the right managing unit 203, using the selected priority information notified by the priority information selecting unit 210. Following the determined priority, the right selecting unit 204 selects the right information having the highest priority among the pieces of right information. The right selecting unit 204 notifies, as selected right information, the right information that was selected, to the right managing unit 203.

The content reproducing unit 205 reproduces the content 211 based on the right information selected by the right selecting unit 204.

The reproduction information obtaining unit 206 obtains, from the content reproducing unit 205, reproduction-count information indicating the number of times the content 211 has been reproduced by the content reproducing unit 205.

The current time measuring unit 207 measures the current time.

The transmitting and receiving unit 208 receives the content 211 and the right 212 distributed by the content distributing company 1, via the mobile communication network 2.

The data analysis unit 209 analyzes data received by the transmitting and receiving unit 208 thereby judging whether the data is the content 211 or the right 212. When the data received by the transmitting and receiving unit 208 is the content 211, the data analysis unit 209 stores the content in the storage unit 201 via the storage control unit 202. When the data received by the transmitting and receiving unit 208 is the right 212, the data analysis unit 209 outputs the right 212 to the right managing unit 203.

Next, the structure of the right 212 and the right information shall be described.

Figure 3:
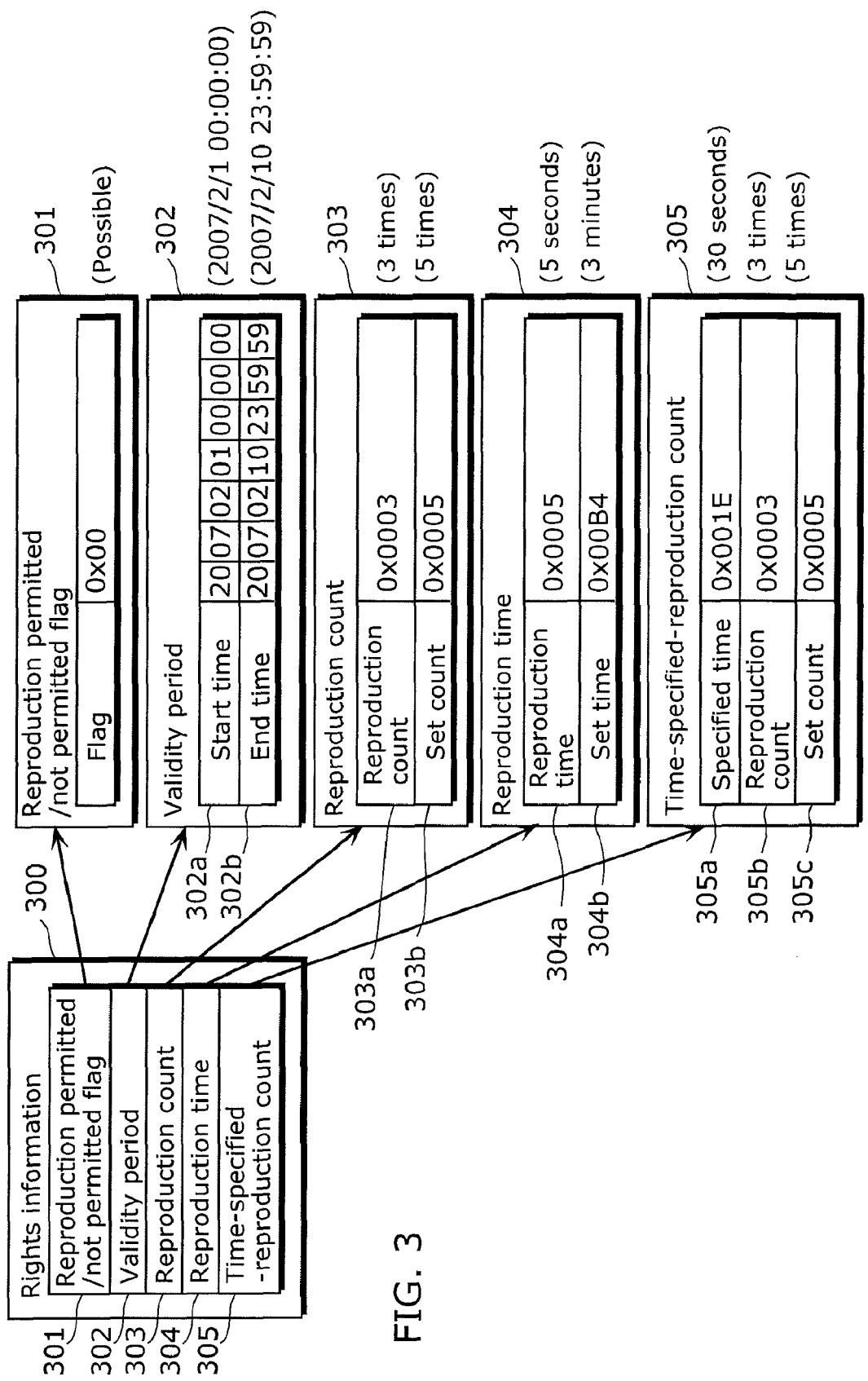
FIG. 3 is a diagram showing the data structure of right information in the first embodiment of the present invention.

FIG. 3 is a diagram conceptually showing the data structure of right information 300 generated by the right managing unit 203. The right information 300 includes a reproduction permitted/not permitted flag 301, a validity period 302, a reproduction count 303, a reproduction time 304, and a time-specified-reproduction count 305. It should be noted that the structure of the right 212 is the same as the right information 300.

The reproduction permitted/not permitted flag 301 is information indicating whether or not reproduction of the content 211 using the right 212 is permitted. In this example, the reproduction permitted/not permitted flag 301 indicates that reproduction is permitted.

The validity period 302 is information specifying the period in which reproduction of the content 211 using the right 212 is permitted.

The validity period 302 includes a start time 302a which is the start time of the validity period of the right 212, and an end time 302b which is an end time for the validity period of the right 212. In this example, the validity period 302 indicates that the validity period for the right is from Feb. 1, 2007, 00:00:00 to Feb. 10, 2007, 23:59:59.

The reproduction count 303 is information specifying the permitted number of reproductions for the content 211, that is, information indicating the remaining number of times for which reproduction of the content 211 using the right 212 is permitted.

The reproduction count 303 includes a reproduction count 303a and a set count 303b. The reproduction count 303a is the number of times the content 211 has already been reproduced using the right 212 up to the time of right judgment. The set count 303b is the predetermined number of reproductions permitted for the content 211 at the time of right obtainment. In this example, the set count 303b is 5 times and the reproduction count 303a is 3 times. Specifically, in this example, the reproduction count 303 indicates that reproduction of the content 211 using the right 212 is permitted for a remaining number of 2 times.

The reproduction time 304 is information specifying the amount of time for which reproduction of the content 211 is permitted, that is, information indicating the remaining number of seconds for which reproduction of the content 211 using the right 212 is permitted.

The reproduction time 304 includes a reproduction time 304a and a set time 304b. The reproduction time 304a is the amount of time for which the content 211 has already been reproduced using the right 212 up to the time of right judgment. The set time 304b is the predetermined amount of time for which reproduction is permitted for the content 211 at the time of right obtainment. In this example, the set time 304b is 3 minutes and the reproduction time is 5 seconds. Specifically, in this example, the reproduction time 304 indicates that reproduction of the content 211 using the right 212 is permitted for a remaining 2 minutes and 55 seconds.

The time-specified-reproduction count 305 is information specifying the number of times a reproduction of the content 211 equal to or greater than a specified time is permitted.

The time-specified-reproduction count 305 includes a specified time 305a, a reproduction count 305b, and a set count 305c. The specified time 305a is the reproduction time up to which point a reproduction is judged to be one reproduction. The reproduction count 305b is the number of times the content 211 has already been reproduced using the right 212 up to the time of right judgment. The set count 305c is the predetermined number of reproductions permitted for the content 211 at the time of right obtainment. In the example, the specified time 305a is 30 seconds, the set count 305b is 5 times, and the reproduction count 305b is 3 times. For example, when the reproduction of the content 211 ends in 5 seconds, the reproduction count 305b does not increase. With this, when the content 211 is mistakenly reproduced through misoperation by the user, the right is not consumed.

It should be noted that although the right information 300 includes the reproduction permitted/not permitted flag 301, the validity period 302, the reproduction count 303, the reproduction time 304, and the time-specified-reproduction count 305 in FIG. 3, it is sufficient for the right information 300 to include the reproduction permitted/not permitted flag 301 and one or more of the validity period 302, the reproduction count 303, the reproduction time 304, and the time-specified-reproduction count 305.

Figure 4A:
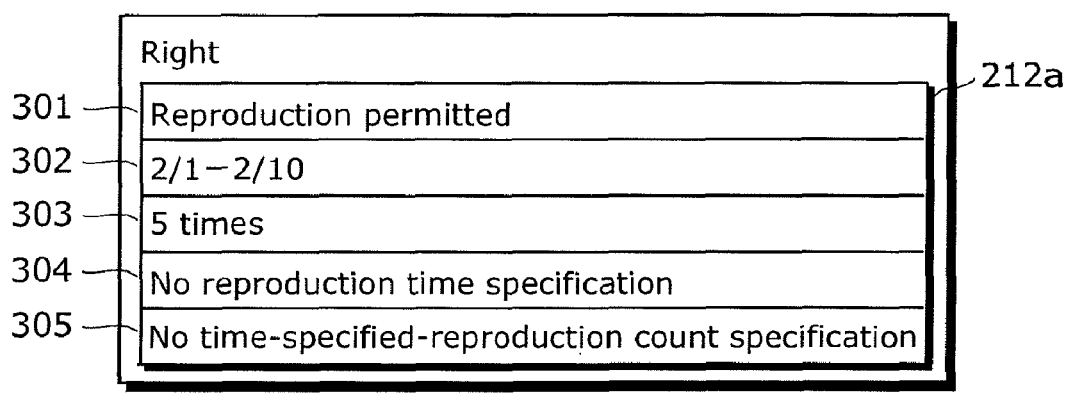
FIG. 4A is diagram showing an example of the structure of a right in the first embodiment of the present invention.
Figure 4B:
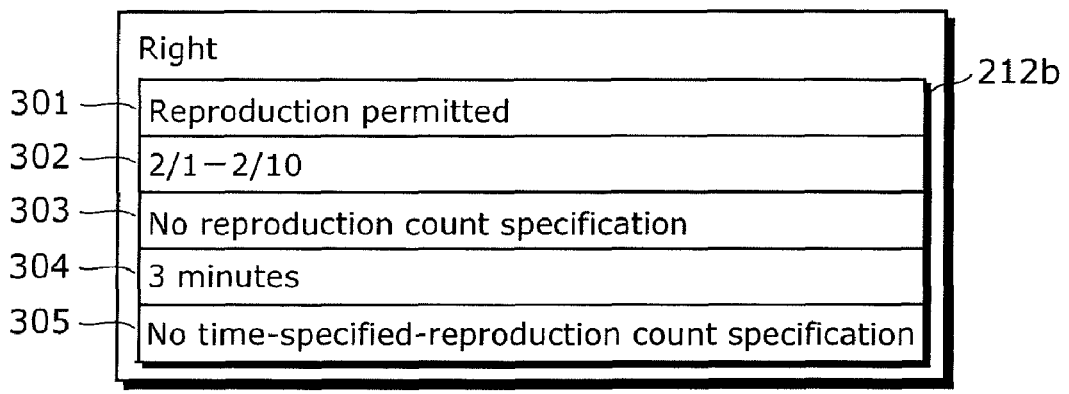
FIG. 4B is diagram showing an example of the structure of a right in the first embodiment of the present invention.

FIG. 4A and FIG. 4B are diagrams indicating specific examples of the right 212 (right information 300). Furthermore, hereafter, dates are denoted in a month/date format, such as denoting February 1 as 2/1.

The right 212a shown in FIG. 4A is a right specifying the validity period 302 and the reproduction count 303, and is a right which permits the content 211 to be reproduced for up to 5 times within a period from 2/1 to 2/10. The right 212b shown in FIG. 4B is a right specifying the validity period 302 and the reproduction time 304, and is a right which permits the content 211 to be reproduced for up to 3 minutes within a period from 2/1 to 2/10.

Next, the priority information 213 shall be described.

FIG. 5A is a diagram showing the priority for a right for each individual restriction information (the validity period 302, the reproduction count 303, the reproduction time 304). When plural pieces of restriction information are included in plural rights 212, priorities are determined by combining the priorities shown in FIG. 5A. Specifically, by combining the priorities shown in FIG. 5A, plural pieces of priority information 213 conforming to various conditions such as the purpose for reproducing the content 211 are determined.

In this example, the 3 components, namely, a remaining validity period 401 which is the remaining validity period, a remaining reproduction count 402 which is the remaining number of reproductions, a remaining reproduction time 403 which is the remaining reproduction time, are assumed to be the judgment components when comparing two rights 212.

With regard to the remaining validity period 401, when two rights 212 are compared, the priority is determined such that the one with the longer remaining validity period is given a higher priority level. With regard to the remaining reproduction count 402, when two rights 212 are compared, the priority is determined such that the one with the greater number of remaining reproductions is given a higher priority level. With regard to the remaining reproduction time 403, when two rights 212 are compared, the priority is determined such that the one with the longer remaining reproduction time is given a higher priority level.

It should be noted that other components such as a time-specified-reproduction time or the time-specified-reproduction count 305 may be added as a judgment component. Here, time-specified-reproduction time refers to information specifying the amount of time for which a reproduction of the content 211 equal to or greater than a specified time is permitted.

Furthermore, the priority level relationships shown in FIG. 5A is merely one example and may be changed accordingly, depending on the desire of the user or the content distributing company 1.

Next, the structure of first priority information 213a and second priority information 213b included in plural pieces of priority information 213 stored in the storage unit 201 shall be described.

FIG. 5B is a diagram showing the structure of the first priority information 213a determined by combining the priorities shown in FIG. 5A. The first priority information 213a is set such that the priority level increases according to an order of: the remaining reproduction count 402, the remaining reproduction time 403, and the remaining validity period 401.

In the first priority information 213a, when two rights are compared, the right having the longer remaining validity period 401 is given 1st priority and the right with the shorter one is given 2nd priority. Furthermore, in the first priority information 213a, when the remaining validity period 401 is the same or both rights have none, the right having the longer remaining reproduction time 403 is given 3rd priority and the right with the shorter one is given 4th priority. In addition, in the first priority information 213a, when the remaining reproduction time 403 is the same or both rights have none, the right having the greater remaining reproduction count 402 is given 5th priority, the right with the lesser one is given 6th priority, and 7th priority is given when the remaining reproduction count 402 is the same.

For example, when comparing the right 212a and the right 212b in FIG. 4A and FIG. 4B, respectively, the same validity period 302 is specified for the right 212a and the right 212b. In addition, the reproduction time 304 is not specified for the right 212a and the reproduction time 304 is specified for the right 212b. Therefore, the priority of the right 212b is 3rd or 4th and the priority of the right 212a is 5th or lower. In other words, the priority of the right 212b is higher than the priority of the right 212a.

FIG. 5C is a diagram showing the structure of second priority information 213b determined by combining the priorities shown in FIG. 5A. The second priority information 213b is set such that priority level increases according to an order of: the remaining reproduction time 403, the remaining reproduction count 402, and the remaining validity period 401.

In the second priority information 213b, when two rights are compared, the right having the longer remaining validity period 401 is given 1st priority and the right with the shorter one is given 2nd priority. Furthermore, in the second priority information 213b, when the remaining validity period 401 is the same or both rights have none, the right having the greater remaining reproduction count 402 is given 3rd priority, and the right with the lesser one is given 4th priority. In addition, in the first priority information 213a, when the remaining reproduction count 402 is the same or both rights have none, right having the longer remaining reproduction time 403 is given 5th priority, the right with the shorter one is given 6th priority, and 7th priority is given when the remaining reproduction time 403 is the same.

For example, when comparing the right 212a and the right 212b in FIG. 4A and FIG. 4B, respectively, the same validity period 302 is specified for the right 212a and the right 212b. In addition the reproduction count 303 is specified for the right 212a and the reproduction count 303 is not specified for the right 212b. Therefore, the priority of the right 212a is 3rd or 4th and the priority of the right 212b is 5th or lower. In other words, the priority of the right 212a is higher than the priority of the right 212b.

In such manner, the priority information 213 specifies the priority level of each of the rights 212 depending on the type of restriction information included in the two rights 212. In addition, when the same type of restriction information is included in the two rights 212, the priority information 213 specifies priorities according to the values of the restriction information.

Next, the structure of the priority information management information 214 shall be described.

FIG. 6A is a diagram showing the structure of the priority information management information 214.

Priority information management information 214 shown in FIG. 6A indicates the combination of 4 reproduction purposes and the priority information 213 associated with each of the 4 reproduction purposes.

In the priority information management information 214, the second priority information 213b which prioritizes the remaining reproduction count 402 is associated with the reproduction purpose "user reproduction" for which reproduction time is relatively long, and the first priority information 213a which prioritizes the remaining reproduction time 403 is associated with the reproduction purposes "incoming-message alert data", "preview", and "wake-up image" for which the respective reproduction times are shorter compared to "user reproduction".

Furthermore, the type of the content 211 may be adopted as a condition for the priority information management information 214.

FIG. 6B is a diagram showing the structure of priority information management information 214a having the type of the content 211 as a condition.

The priority information management information 214a shown in FIG. 6B indicates the combination of 3 content types and priority information 213 associated with each of the 3 content types.

In the priority information management information 214a, the first priority information 213a which prioritizes the remaining reproduction time 403 is associated with the content type "image" for which reproduction time is relatively short, and the second priority information 213b which prioritizes the remaining reproduction count 402 is associated with the content types "music" and "video" for which the respective reproduction times are longer compared to the content type "image". Here, image refers to a still image, and video refers to moving pictures.

Furthermore, in addition to the reproduction purpose for the content 211, the reproduction time of the content 211 may be adopted as a condition for the priority information management information 214

FIG. 6C is a diagram showing the structure of priority information management information 214b having the reproduction time of the content as a condition, in addition to the reproduction purpose for the content 211.

The priority information management information 214b shown in FIG. 6C further specifies a different piece of priority information 213 depending on the reproduction time when, in addition to the two reproduction purposes, the reproduction purpose is "user reproduction".

In the priority information management information 214b, the first priority information 213a which prioritizes the remaining reproduction time 403 is associated with the reproduction purpose "incoming-message alert data" for which reproduction time is relatively short.

Furthermore, in the priority information management information 214b, a different piece of priority information 213 is specified for the reproduction purpose "user reproduction" for which reproduction time is relatively long, depending further on whether or not the reproduction time is longer than the preset set time. Specifically, the first priority information 213a which prioritizes the remaining reproduction time 403 is specified when the reproduction time is shorter than the set time, and the second priority information 213b which prioritizes the remaining reproduction count 402 is specified when the reproduction time is longer than the set time.

Next, the operation of the mobile terminal apparatus 4 in the first embodiment of the present invention shall be described.

Hereinafter, the operation in which the mobile terminal apparatus 4 downloads a content 211 and plural rights 212 from the content distributing company 1 shall be described.

First, the transmitting and receiving unit 208 receives the content 211 and plural rights 212 via the mobile communication network 2.

The data analysis unit 209 analyzes the details of the content 211 and a right 212 received by the transmitting and receiving unit 208, and separates the content 211 and the right 211 from the received data. The data analysis unit 209 stores the separated content 211 in the storage unit 201 via the storage control unit 202. Furthermore, the data analysis unit 209 outputs the separated right 212 to the right managing unit 203.

The right managing unit 203 associates respective rights 212 and the content 211, and stores the associated rights 212 in the storage unit 201 via the storage control unit 202.

As described above, the mobile terminal apparatus 4 downloads the content 211 and the plural rights 212 from the content distributing company 1, and stores these in the storage unit 201.

Next, the operation for reproducing the content 211 performed by the mobile terminal apparatus 4 shall be described.

Figure 7:
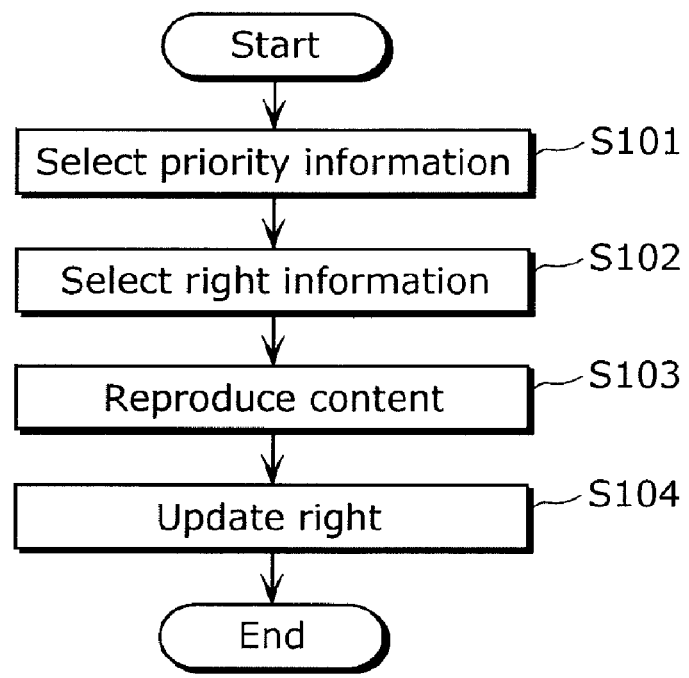
FIG. 7 is a flowchart showing the flow of the content reproduction operation performed by the mobile terminal apparatus in the first embodiment of the present invention.

FIG. 7 is a flowchart showing the flow of the content 211 reproduction operation performed by the mobile terminal apparatus 4.

Here, description is made exemplifying the case where the plural rights 212 stored in the storage unit 201 are the right 212a and the right 212b shown in FIG. 4A and FIG. 4B, and the content 211 is to be reproduced by the mobile terminal apparatus 4 on February 9.

Furthermore, the content 211 associated with the two rights 212a and 212b is a music content having a reproduction time of 1 minute when reproduced in its entirety.

First, the storage control unit 202 reads, from the storage unit 201, the plural rights 212 (the rights 212a and 212b) corresponding to the content 211 to be reproduced, and outputs the read rights 212a and 212b to the right managing unit 203.

The right managing unit 203 judges the permission or non-permission for reproducing the content 211 which is indicated in each of the plural rights 212a and 212b, and generates plural pieces of right information indicating the judgment result. Specifically, the right managing unit 203 judges whether reproduction of the content 211 using the rights 212a and 212b is permitted or not permitted based on the reproduction permitted/not permitted flag 301 included in the rights 212a and 212b, and the current date and time and the validity period 302. Furthermore, the right managing unit 203 changes, to reproduction-not-permitted, the reproduction permitted/not permitted flag 301 corresponding to the rights 212a and 212b for which not permitted is judged.

It should be noted that the reproduction permitted/not permitted flag 301 need not be included in the rights 212 stored in the storage unit 201. In this case, when a right 212 is read, the right managing unit 203 may generate the reproduction permitted/not permitted flag 301 based on the current date and time, the validity period 302, the reproduction count 303, the reproduction time 304, and the time-specified-reproduction count 305.

The right managing unit 203 notifies the generated plural pieces of right information to the right selecting unit 204.

In accordance with the priority information management information 214 obtained from the storage unit 201 via the storage control unit 202, the priority information selecting unit 210 selects the priority information 213 associated with the reproduction condition for the content 211 to be reproduced (S101).

Specifically, when using the priority information management information 214 shown in FIG. 6A, the priority information selecting unit 210 obtains information concerning the reproduction purpose for the content 211. In accordance with the priority information management information 214, the priority information selecting unit 210 selects, when the reproduction purpose for the content 211 is reproduction by the user (user reproduction), the second priority information 213b which prioritizes the remaining reproduction count 402, from the pieces of priority information 213 stored in the storage unit 201.

Furthermore, when the reproduction purpose for the content 211 is incoming-message alert data, the priority information selecting unit 210 selects the first priority information 213a which prioritizes the remaining reproduction time 403, from the pieces of priority information 213 stored in the storage unit 201.

Furthermore, when the reproduction purpose for the content 211 is preview or wake-up image, the priority information selecting unit 210 selects the first priority information 213a which prioritizes the remaining reproduction time 403.

Furthermore, when using the priority information management information 214a shown in FIG. 6B, the priority information selecting unit 210 obtains information concerning the type of the content 211. Here, since the type of the content 211 is "music", the priority information selecting unit 210 selects the first priority information 213a which prioritizes the remaining reproduction time 403.

The priority information selecting unit 210 notifies the priority information 203 that has been selected, as selected priority information, to the right selecting unit 204.

The right selecting unit 204 judges the priority for the pieces of right information notified by the right managing unit 203, according to the selected priority information notified by the priority information selecting unit 210, and selects the right information having the highest priority (S102).

Specifically, the right selecting unit 204 selects the right information corresponding to the right 212b for which the reproduction time 304 is specified, when the selected priority information is the first priority information 213a, and selects the right information corresponding to the right 212a for which the reproduction count 303 is specified, when the selected priority information is the first priority information 213a.

The right selecting unit 204 generates selected right information which is the right information that has been selected.

When the right information is determined, the storage control unit 202 reads the content 211 from the storage unit 201. The content reproducing unit 205 starts the reproduction of the content 211 read by the storage control unit 202 (S103).

At the time when the content reproducing unit 205 starts the reproduction of the content 211, the right managing unit 203 obtains the current time from the current time measuring unit 207, and stores the obtained current time as the reproduction start time.

After the end of the reproduction of the content 211 by the content reproducing unit 205, the content reproducing unit 205 notifies the reproduction information obtaining unit 206 of reproduction count information which indicates the number of times the content 211 has been reproduced with the present reproduction.

The right managing unit 203 obtains the reproduction count information from the reproduction information obtaining unit 206. Furthermore, the right managing unit 203 generates reproduction time information indicating the time for which the content 211 has been reproduced, by obtaining the difference between the current time obtained from the current time measuring unit 207 and the stored reproduction start time.

The right managing unit 203 updates the reproduction count 303a or the reproduction time 304a included in the right 212 using the reproduction count information or the reproduction time information, respectively (S104). Furthermore, when the reproduction count 303a or the reproduction time 304a reaches the set count 303b or the set time 304b, respectively, as a result of the update, the right managing unit 203 updates the reproduction permitted/not permitted flag 301 to indicate not-permitted. The right managing unit 203 stores the updated right 212 into the storage unit 201 via the storage control unit 202.

With the foregoing, the mobile terminal apparatus 4 in the first embodiment of the present invention stores: plural pieces of priority information 213 each indicating the priority of plural rights 212; and priority information management information 214 indicating the association between the plural pieces of priority information 213 and the reproduction conditions for the content 211. Using the priority information management information 214, the mobile terminal apparatus 4 selects the priority information 213 according to the reproduction conditions for the content 211. The mobile terminal apparatus 4 selects, according to the selected priority information 213, the right 212 to be used in reproducing the content 211, from among the plural rights 212.

With this, the mobile terminal apparatus 4 in the first embodiment of the present invention can reproduce the content 211 using the optimal right 212 among the plural rights 212, in compliance with the reproduction conditions for the content 211.

Specifically, when using music data as incoming-message alert data for phone calls or e-mail, the reproduction time per reproduction is short. By using the priority information management information 214 shown in FIG. 6A, the priority information selecting unit 210 selects the first priority information 213a which prioritizes the reproduction time 304 over the reproduction count 303. With this, the right selecting unit 204 selects the right 212b for which the reproduction time 304 is specified.

For example, assuming an e-mail arrival notification time of 10 seconds when the content 211 is used as e-mail incoming-message alert data, reproduction is permitted for only 5 times when the right 212a is used, whereas reproduction is permitted for 18 times when the right 212b is used.

On the other hand, in the case of user reproduction in which the user selects direct reproduction from a content list and the like, the priority information selecting unit 210 selects the second priority information 213b which prioritizes the reproduction count 303 over the reproduction time 304. With this, the right selecting unit 204 selects the right 212a for which the reproduction count 303 is specified.

For example, when the content 211 is reproduced by being explicitly selected by the user from a content list and the like, the content 211 is reproduced for 1 minute for each reproduction, and thus reproduction is permitted for 5 times when the right 212a is used, but reproduction is permitted for only 3 times when the right 212b is used.

In this manner, the mobile terminal apparatus 4 selects the right 212b for which the reproduction time 304 is specified, when the reproduction time for one reproduction of the content 211 is short, and selects the right 212a for which the reproduction count 303 is specified, when the reproduction time for one reproduction of the content 211 is long. In other words, the mobile terminal apparatus 4 can reproduce the content 211 using the right 212 which maximizes the number of times and the time for which reproduction is permitted.

Furthermore, when the type of the content 211 is an image, the reproduction time for one reproduction is relatively short. By using the priority information management information 214a shown in FIG. 6B, the priority information selecting unit 210 selects, from the pieces of priority information 213, the first priority information 213a which prioritizes the reproduction time 304 over the reproduction count 303. With this, the right selecting unit 204 selects the right 212b for which the reproduction time 304 is specified.

On the other hand, when the type of the content is music or video, the reproduction time for one reproduction is relatively long. When the type of the content 211 is music or video, the priority information selecting unit 210 selects, from the pieces of priority information 213, the second priority information 213b which prioritizes the reproduction count 303 over the reproduction time 304. With this, the right selecting unit 204 selects the right 212a for which the reproduction count 303 is specified.

In this manner, the mobile terminal apparatus 4 selects the right 212b for which the reproduction time 304 is specified, when the reproduction time for one reproduction of the content 211 is short, and selects the right 212a for which the reproduction count 303 is specified, when the reproduction time for one reproduction of the content 211 is long. In other words, the mobile terminal apparatus 4 can reproduce the content 211 using the right 212 which maximizes the number of times for which reproduction is permitted.

It should be noted that, when selecting the priority information 213 using the priority information management information 214b shown in FIG. 6C, the selection of the right (S102) is not performed only prior to the reproduction of the content 211 as previously described, and there is a need to perform a re-selection of the right after the content 211 is actually reproduced.

For example, in the case of user reproduction in which the content is reproduced by being explicitly selected by the user, the second priority information 213b which prioritizes the remaining reproduction count 402 is selected as the priority information 213 prior to content reproduction, and the reproduction of the content 211 is performed.

However, when the user stops reproduction during the reproduction, there is a possibility that the reproduction time is very short compared to the reproduction time when the content 211 is reproduced in its entirety. Even in such a case, after the end of the reproduction, the right managing unit 203 notifies the generated reproduction time information to the priority information selecting unit 210 in order to efficiently use the right 212. The priority information selecting unit 210 selects the priority information again by using the priority information management information 214b shown in FIG. 6C, which has the reproduction time as a condition in addition to the reproduction purpose.

Hereinafter, details of the operation of the mobile terminal apparatus 4 when selecting the priority information 213 using the priority information management information 214b shown in FIG. 6C shall be described. Here, description is made exemplifying the case of reproducing music data for which the time when the content is reproduced in its entirety is 1 minute. Furthermore, the set time which is a condition of the priority information management information 214b is assumed to be 10 seconds which is the same as with the e-mail arrival notification time. Furthermore, as priority information management information 214, the priority information selecting unit 210 uses the priority information management information 214 shown in FIG. 6A for the reproduction start time, and uses the priority information management information 214b shown in FIG. 6C for the reproduction end time.

Figure 8:
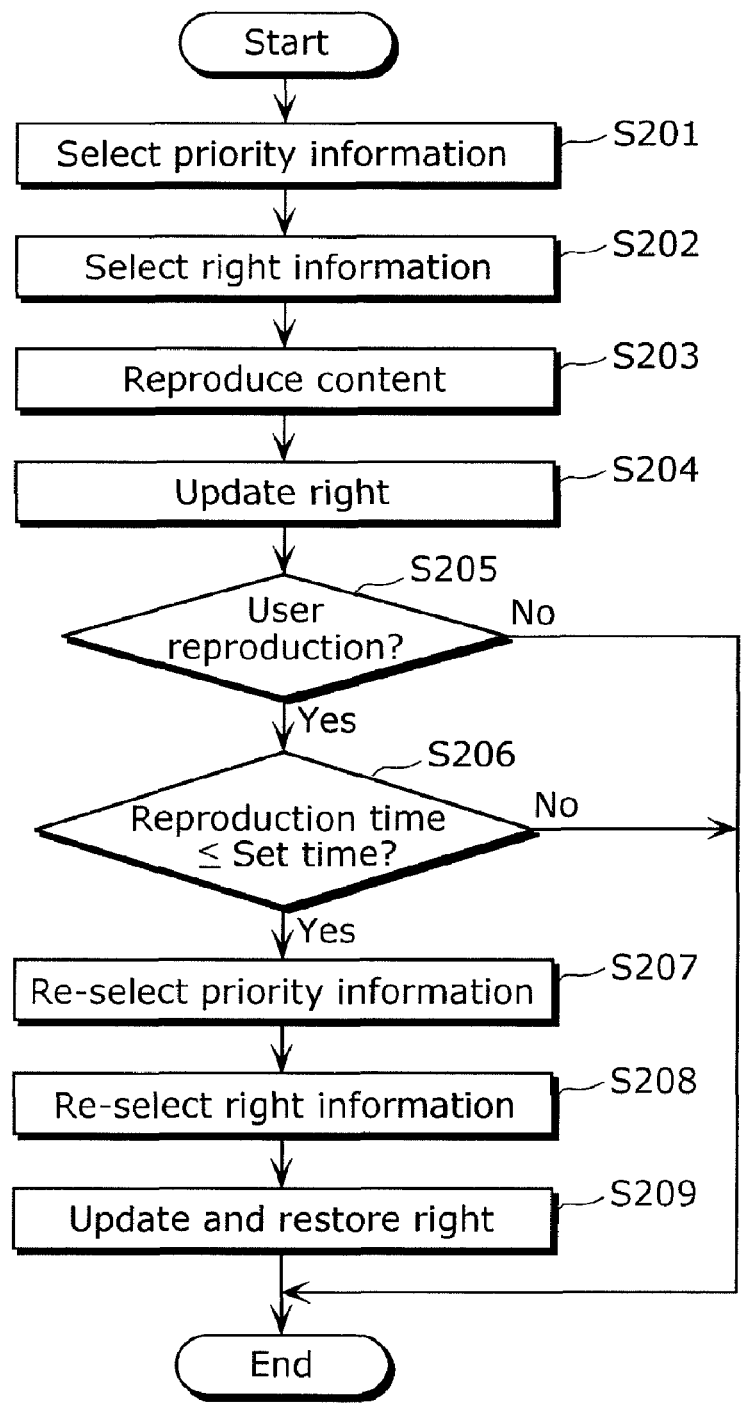
FIG. 8 is a flowchart showing the flow of a modification of the content reproduction operation performed by the mobile terminal apparatus in the first embodiment of the present invention.

FIG. 8 is a flowchart showing the flow of the content reproduction operation performed by the mobile terminal apparatus 4 when selecting the priority information 213 using the priority information management information 214b shown in FIG. 6C.

At the reproduction start time, the priority information selecting unit 210 selects the second priority information 213b which prioritizes the remaining reproduction count 402, based on the priority information management information 214 shown in FIG. 6A (S201). The right selecting unit 204 selects the right 212a for which the reproduction count 303 is specified, in accordance with the second priority information 213b (S202).

Next, the content reproducing unit 205 reproduces the content 211 (S203).

Next, the right managing unit 203 updates the right 212a (S204).

Here, it is assumed that the user stops reproduction 5 seconds after the start of reproduction of the content 211. In this case, the reproduction purpose is user reproduction (Yes in S205) and reproduction time $\leqq$ set time (Yes in S206), and thus, after the reproduction of the content 211, the priority information selecting unit 210 re-selects the first priority information 213a which prioritizes the remaining reproduction time 403, based on the priority information management information 214b shown in FIG. 6C (S207).

The re-selected first priority information 213a is notified to the right selecting unit 204. The right selecting unit 204 re-selects, as the right information, the right 212b for which the reproduction time 304 is specified, in place of the right 212a for which the reproduction count 303 is specified.

The right managing unit 203 updates the re-selected right 212b. The right managing unit 203 stores the updated right 212b into the storage unit 201 via the storage control unit 202. Furthermore, the right managing unit 203 returns the right 212a updated in step S204 to its pre-updating state.

In this manner, after content reproduction, the priority information selecting unit 210 re-selects the priority information 213, and the right selecting unit 204 re-selects the right information in accordance with the re-selected priority information. With this, the mobile terminal apparatus 4 can change the right 212 selected prior to reproduction.

It should be noted that, when the user does not stop reproduction after the start of reproduction, reproduction time>set time (No in S206), and the second priority information 213b which is the same as that prior to the start of reproduction is selected, and thus re-selection of the right 212 is not performed. Furthermore, when the content 211 is used as e-mail incoming-message alert data (No in S205), the first priority information 213a which is the same as that prior to the start of reproduction is selected, and thus re-selection of the right 212 is not performed.

In this manner, when the reproduction time for the content 211 in the user reproduction becomes shorter than planned, the mobile terminal apparatus 4 does not use, as is, the right 212a determined prior to reproduction, for which the reproduction count 303 is restricted, and instead uses the right 212b for which the reproduction time 304 is restricted, and thus the content 211 can be reproduced in the state which is most advantageous to the user.

Second Embodiment

A terminal apparatus in a second embodiment of the present invention shall be described with reference to FIG. 9 to FIG. 11.

First, the configuration of the terminal apparatus in the second embodiment of the present invention shall be described.

Figure 9:
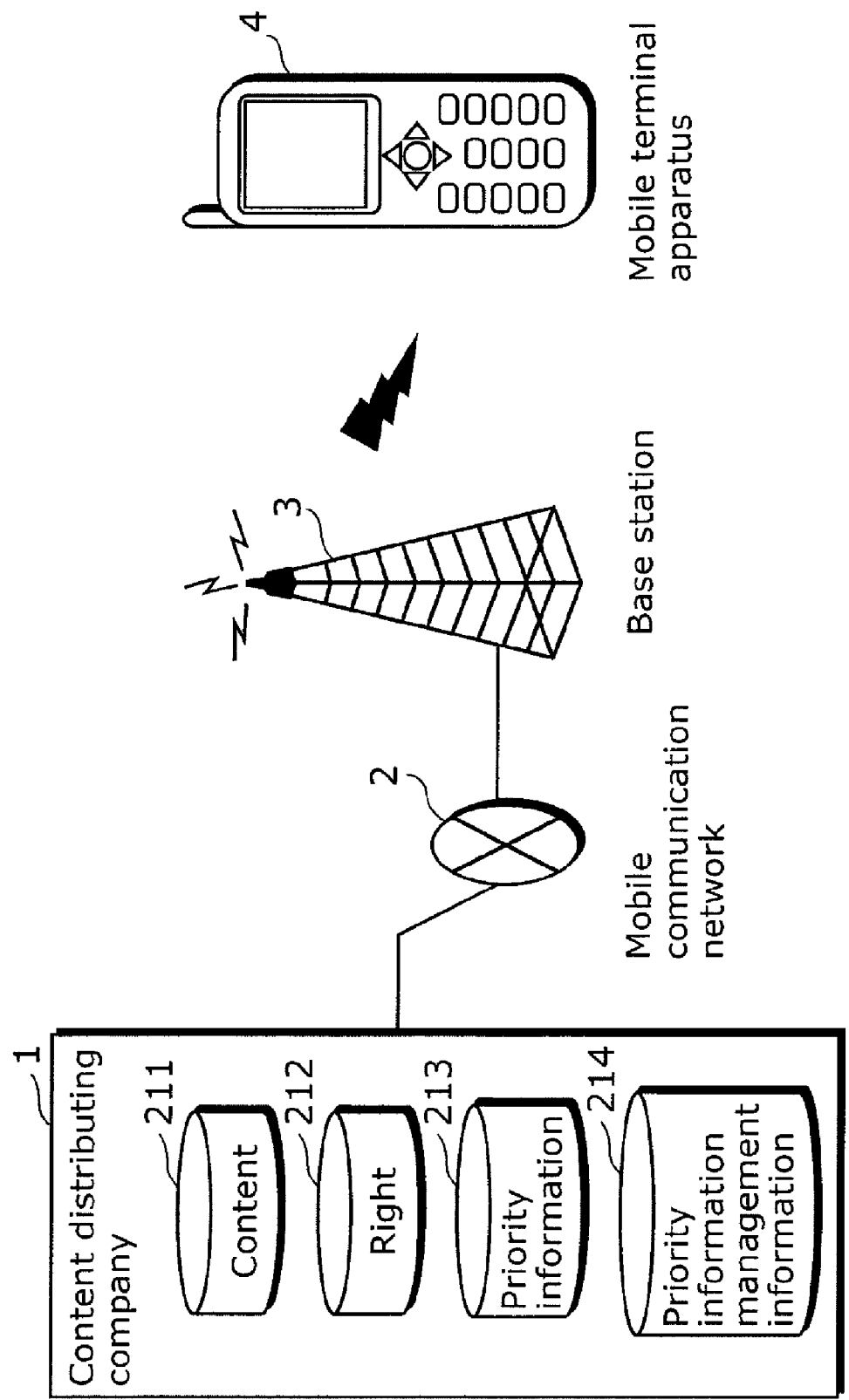
FIG. 9 is a diagram showing the outline configuration of a content distribution service using a mobile terminal apparatus in a second embodiment of the present invention.

FIG. 9 is diagram conceptually showing a service in the second embodiment of the present invention.

In the first embodiment of the present invention, the priority information 213 and the priority information management information 214 are stored in advance in the storage unit 201. However, in the second embodiment of the present invention, the priority information 213 and the priority information management information 214 are distributed to the mobile terminal apparatus 4 via a network such as the Internet, and the distributed the priority information 213 and the priority information management information 214 are stored in the storage unit 201.

Specifically, as shown in FIG. 9, the priority information 213 and the priority information management information 214 distributed by the content distributing company 1 pass through a mobile communication network 2 and are distributed from a base station 3 to a mobile terminal apparatus 4, in the same manner as the content 211 and the right 212.

Figure 10:
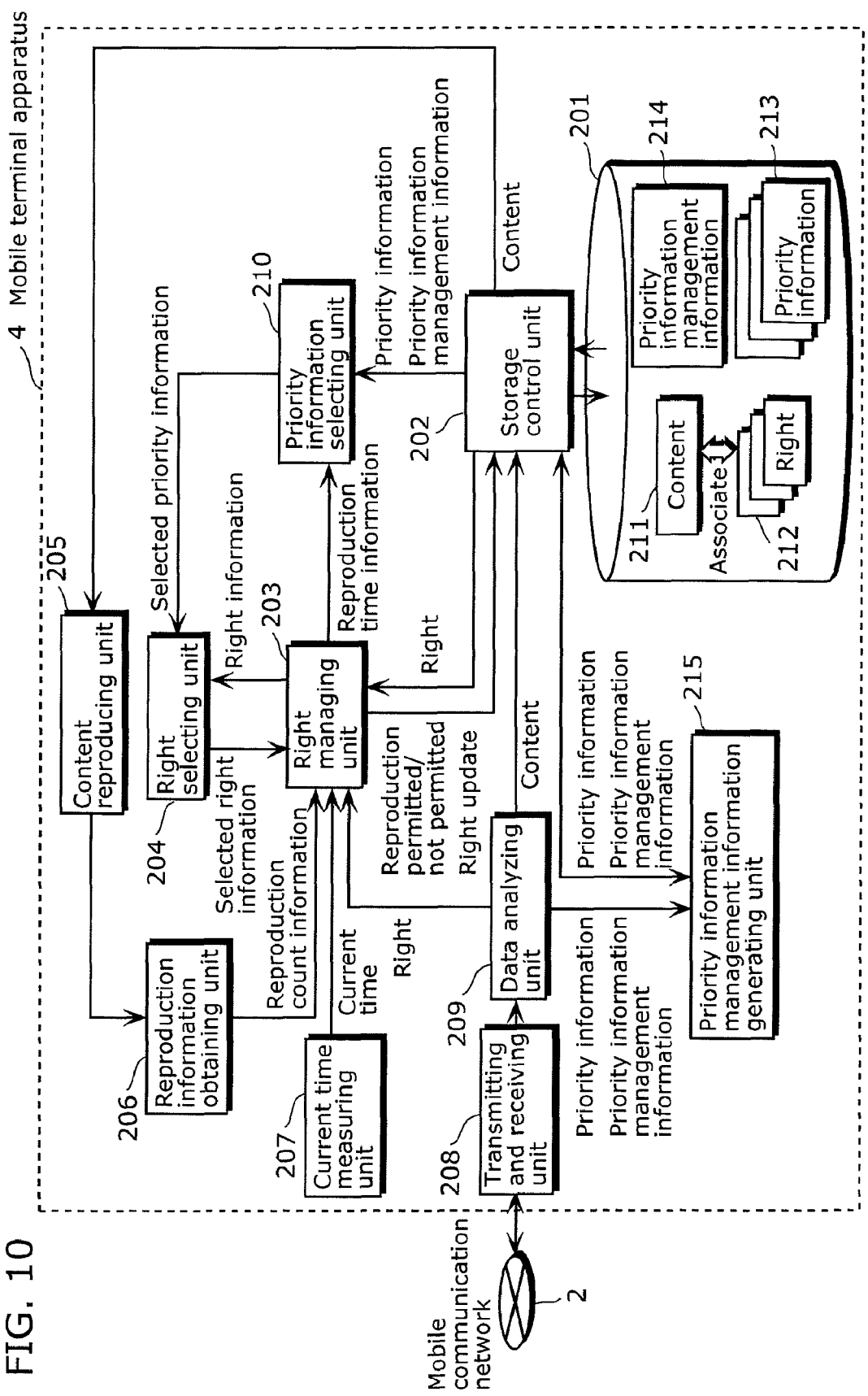
FIG. 10 is a diagram showing the configuration of the mobile terminal apparatus in the second embodiment of the present invention.

FIG. 10 is a block diagram showing the configuration outline of the mobile terminal apparatus 4 in the second embodiment of the present invention.

The mobile terminal apparatus 4 shown in FIG. 10 includes a priority information management information generating unit 215 in addition to the configuration of the mobile terminal apparatus 4 in the first embodiment.

Furthermore, the transmitting and receiving unit 208 obtains the priority information 213 and the priority information management information 214 via the mobile communication network 2. The transmitting and receiving unit 208 notifies the priority information management information generating unit 215 of the obtained the priority information 213 and the priority information management information 214, via the data analyzing unit 209.

The priority information management information generating unit 215 stores the priority information 213 and the priority information management information 214 in the storage unit 201 via the storage control unit 202.

With this configuration, the content distributing company 1 can specify desired priority information 213 and priority information management information 214.

Next, the priority information generation operation performed by the mobile terminal apparatus 4 shall be described.

Figure 11:
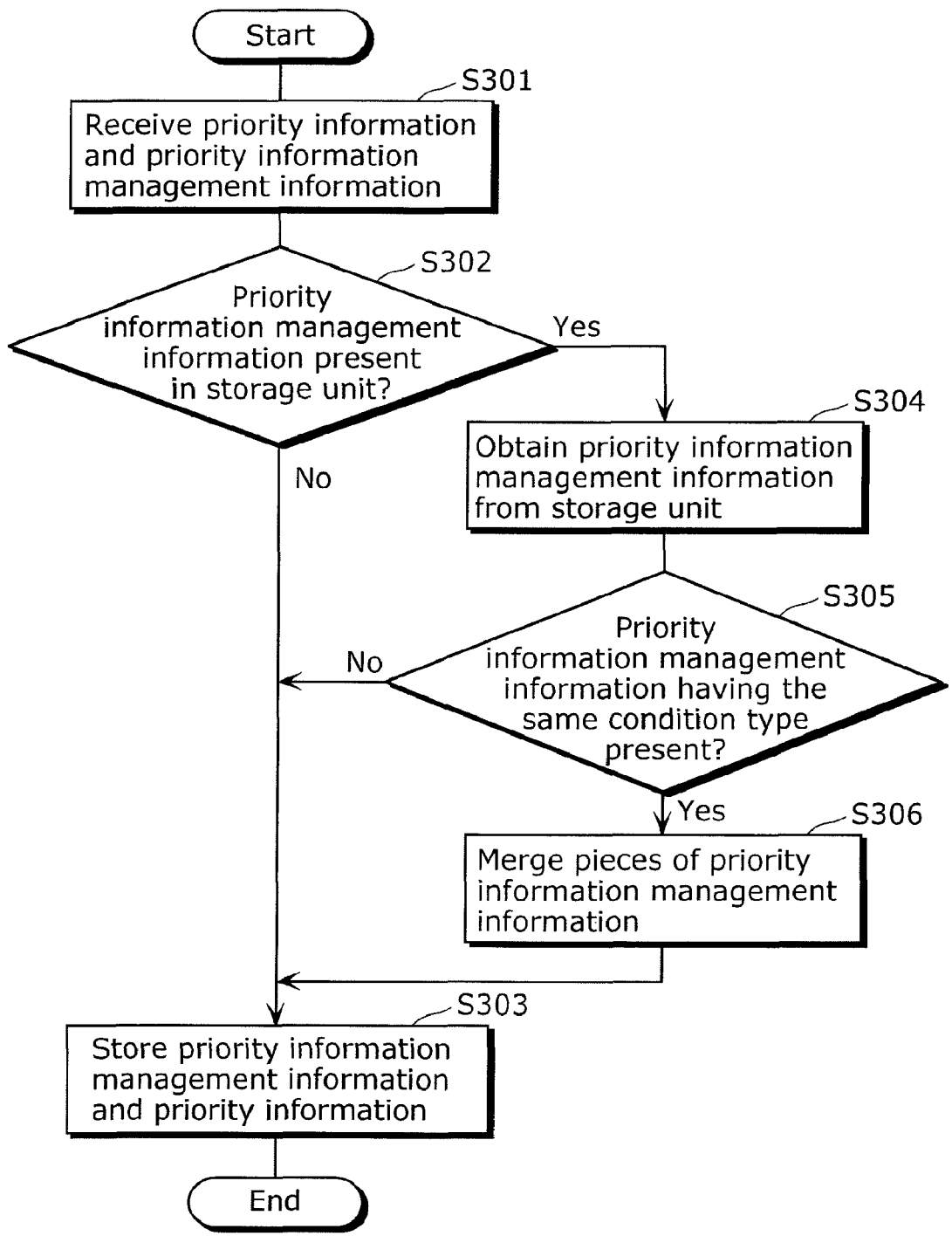
FIG. 11 is a flowchart showing the flow of the priority information generation operation performed by the mobile terminal apparatus in the second embodiment of the present invention.

FIG. 11 is a flowchart showing the flow of the priority information generation operation performed by the mobile terminal apparatus 4.

First, the transmitting and receiving unit 208 receives priority information 213 and priority information management information 214 (S301).

Next, the priority information management information generating unit 215 judges whether or not priority information management information 214 is already stored in the storage unit 201 (S302).

When priority information management information 214 is not stored in the storage unit 201 (No in S302), the priority information management information generating unit 215 stores the priority information 213 and the priority information management information 214 received in step S301, in the storage unit 201 via the storage control unit 202 (S303).

On the other hand, when priority information management information 214 is stored in the storage unit 201 (Yes in S302), the priority information management information generating unit 215 then obtains the priority information management information 214 stored in the storage unit 201, via the storage control unit 202 (S304).

Next, the priority information management information generating unit 215 judges whether or not the priority information management information 214 stored in the storage unit 201 obtained in step S304 has the same condition type (reproduction purpose, content type, or the like) as the condition type included in the priority information management information 214 received in step S301 (S305).

When it does not have the same condition type (No in S305), the priority information management information generating unit 215 stores the priority information 213 and the priority information management information 214 received in step S301, in the storage unit 201, as the priority information 213 and the priority information management information 214 (S303).

At this juncture, the priority information management information generating unit 215 may delete the priority information 213 and the priority information management information 214 that was already stored in the storage unit 201, or plural pieces of priority information management information 214 and plural pieces of priority information 213 each corresponding to one of the plural pieces of priority information management information 214 may be stored in the storage unit 201. When plural pieces of priority information management information 214 are stored in the storage unit 201, it is sufficient to use one of the plural pieces of priority information management information 214 in accordance with an instruction from the content distributing company 1 or a user setting in the mobile terminal apparatus 4.

On the other hand, when it has the same condition type in step S305 (Yes in S305), the priority information management information generating unit 215 merges the newly received priority information management information 214 and the priority information management information 214 stored in the storage unit 201 (S306). The priority information management information generating unit 215 updates the priority information management information 214 stored in the storage unit 201 with the merged priority information management information 214. Furthermore, the priority information management information generating unit 215 stores the newly received priority information 213 in the storage unit 201.

For example, assume that, in the priority information management information 214 shown in FIG. 6A, a priority information management information 214 having only the 3 conditions "user reproduction", "incoming-message alert data", and "preview", is stored in the 201, and a priority information management information 214 having a condition "wake-up image" is newly transmitted from the content distributing company 1. In this case, the priority information management information generating unit 215 generates the priority information management information 214 shown in FIG. 6A by merging the above-mentioned 2 pieces of priority information management information 214.

It should be noted that the priority information management information 214 held in the storage unit 201 and the newly received priority information management information 214 may be distributed from the same content distributing company 1 or may be distributed from different content distributing companies 1.

Accordingly, with the mobile terminal apparatus 4 in the second embodiment of the present invention, the content distributing company 1 can change and update the priority information 213 and the priority information management information 214 at an arbitrary timing.

Third Embodiment

Next, a terminal apparatus in a third embodiment of the present invention shall be described with reference to FIG. 12 to FIG. 14.

In the first embodiment of the present invention, the priority information management information 214 is stored in advance in the storage unit 201. However, in the third embodiment of the present invention, the mobile terminal apparatus 4 generates and changes the priority information management information 214.

First, the configuration of the mobile terminal apparatus 4 in the third embodiment of the present invention shall be described.

It should be noted that the conceptual image of the service concerning the downloading and reproduction of the copyright-protected content 211 is the same as in FIG. 1.

Figure 12:
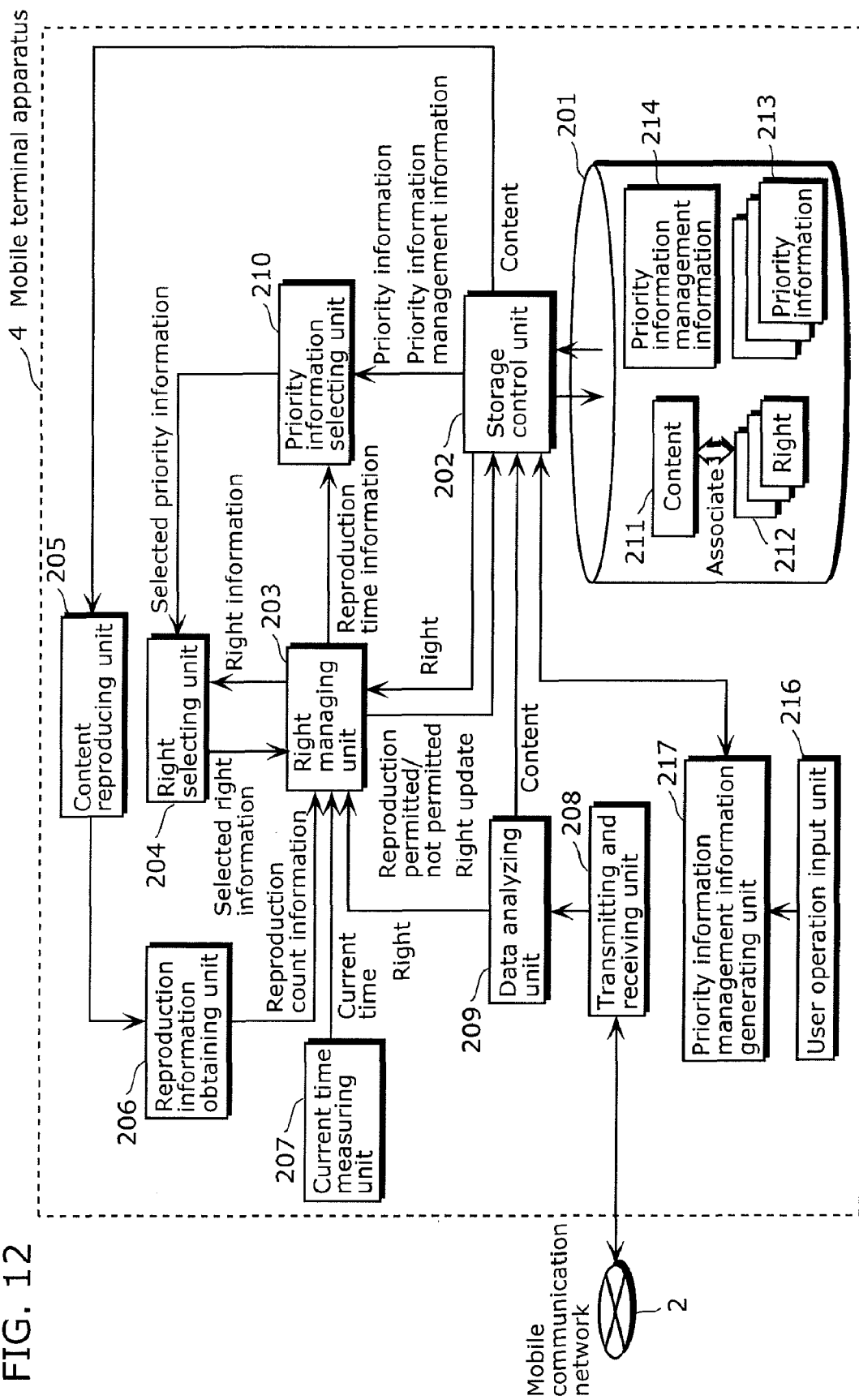
FIG. 12 is a diagram showing the configuration of a mobile terminal apparatus in the third embodiment of the present invention.

FIG. 12 is a block diagram showing the configuration of the mobile terminal apparatus 4 in the third embodiment of the present invention.

The mobile terminal apparatus 4 shown in FIG. 12 further includes a user operation input unit 216 and a priority information management information generating unit 217, in addition to the configuration of the mobile terminal apparatus 4 in the first embodiment shown in FIG. 2.

The operations by the user concerning the reproduction or changing of the priority information management information 214 are inputted to the user operation input unit 216.

The priority information management information generating unit 217 performs the reproduction or the changing of the priority information management information 214, in response to the user operation inputted to the user operation input unit 216.

Furthermore, the priority information management information generating unit 217 generates or changes the priority information management information 214 depending on the state of the plural rights 212 stored in the storage unit 201. Specifically, when a right 212 is newly stored in the storage unit 201, the priority information management information generating unit 217 generates a new priority information management information 214 or changes the current priority information management information 214, according to the details of such right 212. Furthermore, when the right 212 is updated following the reproduction of the content 211, the priority information management information generating unit 217 changes the priority information management information 214.

Next, the operation of the mobile terminal apparatus 4 in the third embodiment of the present invention shall be described.

First, the operation of the mobile terminal apparatus 4 when changing the priority information management information 214 in accordance with a user operation shall be described.

Furthermore, here, an example in which the priority information management information 214 shown in FIG. 6A is set in the storage unit 201 by the user shall be described.

FIG. 13 is a diagram showing an example of a user operation input screen. As shown in FIG. 13, whether to prioritize the reproduction time or the reproduction count for each condition is set by user operation. The priority information management information generating unit 217 generates a priority information management information 214 in which the first priority information 213a is associated with a condition in which "reproduction time prioritized" is set, and the second priority information 213b is associated with a condition in which "reproduction count prioritized" is set.

The priority information management information generating unit 217 stores the generated priority information management information 214 in the storage unit 201 via the storage control unit 202.

It should be noted that, when the priority information 213 is specified according to the magnitude relation between the reproduction time and the set time as in the priority information management information 214b shown in FIG. 6C, the set time in the priority information management information 214b may be set through user operation.

Furthermore, plural pieces of priority information 213 may be set by user operation.

With the forgoing, the mobile terminal apparatus 4 in the third embodiment of the present invention can change the priority information management information 214 in response to a user operation. With this, it is possible to improve user convenience.

Next, the operation of the mobile terminal apparatus 4 when changing the priority information management information 214 in accordance with the states of plural rights 212 shall be described.

Figure 14:
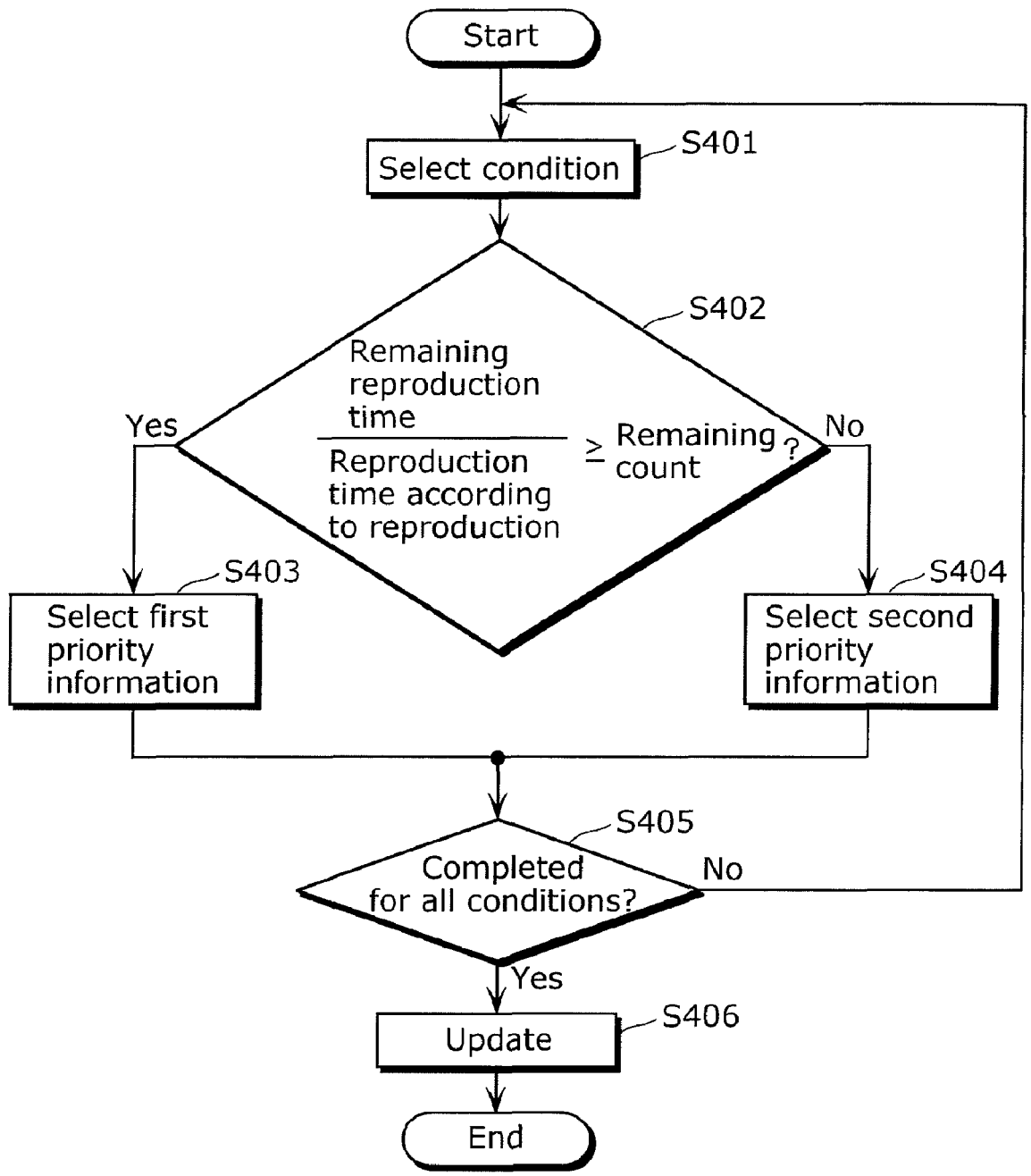
FIG. 14 is a flowchart showing the flow of the operation for changing the priority information management information performed by the mobile terminal apparatus in the third embodiment of the present invention.

FIG. 14 is a flowchart showing the flow of the operation performed by the priority information management information generating unit 217 when changing the priority information management information 214 in accordance with the states of plural rights 212 shall be described.

Furthermore, here, it is assumed that the priority information management information 214 shown in FIG. 6A and the rights 212a and 212b shown in FIG. 4A and FIG. 4B, respectively, are stored in the storage unit 201. Furthermore, it is assumed that the reproduction time for the content 211 when the reproduction purpose is user reproduction is 1 minute, and the reproduction time for the content 211 when the reproduction purpose is incoming-message alert data is 10 seconds.

First, the case is described where reproduction of the content 211 using the right 212a and the right 212b has never been performed.

First, the priority information management information generating unit 217 selects, for example, "user reproduction" out of the conditions included in the priority information management information 214 (S401).

Next, the priority information management information generating unit 217 calculates the reproduction count (3 times) for when user reproduction is performed using the right 212b, by dividing the remaining reproduction time (3 minutes) for the right 212b by the reproduction time (1 minute) according to "user reproduction". The priority information management information generating unit 217 compares the quotient value and the remaining reproduction count of the right 212a, and judges whether or not the quotient value is greater than the remaining reproduction count of the right 212a (S402).

Here, since the quotient value (3 times) is less than the remaining reproduction count (5 times) (No in S402), the priority information management information generating unit 217 selects the second priority information 213b which prioritizes the remaining reproduction count 402 over the remaining reproduction time 403, as the priority information 213 associated with the condition "user reproduction" (S404).

Here, since processing for all the conditions has not been completed (No in S405), next, the priority information management information generating unit 217 selects the condition "incoming-message alert data" (S401).

Next, the priority information management information generating unit 217 calculates the reproduction count (18 times) for when arrival notification is performed using the right 212*b*, by dividing the remaining reproduction time (3 minutes) for the right 212*b* by the reproduction time (10 seconds) according to "incoming-message alert data". The priority information management information generating unit 217 compares the quotient value and the remaining reproduction count of the right 212*a*, and judges whether or not the quotient value is greater than the remaining reproduction count of the right 212*a* (S402).

Here, since the quotient value (18 times) is greater than the remaining reproduction count (5 times) (Yes in S402), the priority information management information generating unit 217 selects the first priority information 213*a* which prioritizes the remaining reproduction time 403 over the remaining reproduction count 402, as the priority information 213 associated with the condition "incoming-message alert data" (S403).

Next, the same processing is performed for the conditions "preview" and "wake-up image" and, when processing is completed for all the conditions (Yes in S405), the priority information management information generating unit 217 generates priority information management information 214 in which the plural pieces of priority information 213 selected in steps S403 and S404 are associated with the respective conditions. The priority information management information generating unit 217 changes the priority information management information 214 stored in the storage unit 201 with the generated priority information management information 214 (S406).

Next, the case is described where reproduction of the content 211 using the right 212*a* is performed and the remaining reproduction count for the right 212*a* is 1 time.

In this case, in step S402 for "user reproduction", the quotient value (3 times) resulting from dividing the remaining reproduction time (3 minutes) for the right 212*b* by the reproduction time (1 minute) according to "user reproduction" is greater than the remaining reproduction count (1 time) for the right 212*a*, and thus the priority information management information generating unit 217 selects the first priority information 213*a* which prioritizes the remaining reproduction time over the remaining reproduction count, as the priority information 213 associated with the condition "user reproduction".

With this, the respective pieces of priority information 213 associated with the conditions "user reproduction" and "incoming-message alert data" are both the first priority information 213*a* which prioritizes the remaining reproduction time 403 over the remaining reproduction count 402.

With the forgoing, the mobile terminal apparatus 4 in the third embodiment of the present invention can select the most appropriate right 212, depending on the usage state of the plural rights 212.

It should be noted that, when the right 212 is updated by the right managing unit 203 after content reproduction, the priority information management information generating unit 217 performs the processing shown in FIG. 14 for every predetermined period or in accordance with a user operation.

Furthermore, the reproduction time according to each reproduction purpose may be set by the operation of the user via the user operation input unit 216, or stored in advance in the storage unit 201, or obtained by the transmitting and receiving unit 208 via the mobile communication network 2.

Furthermore, the mobile terminal apparatus 4 can generate the priority information management information 214 using the process shown in FIG. 14, when a new right 212 is obtained. For example, when the mobile terminal apparatus 4 newly obtains a right 212 in a situation where only the right 212*a* is stored in the storage unit 201, the priority information management information 214 can be generated using the process shown in FIG. 14.

Although the mobile terminal apparatus in the embodiments of the present invention has been described thus far, the present invention is not limited to such embodiments.

For example, although description is made for the case where the content 211 is mainly music data in the description of the aforementioned first to third embodiments, the content 211 may be audio data other than music, a still image, video, or an application program such as a Java™ application which displays animation and the like. In other words, the above described content reproduction can be replaced with content processing. Here, content processing refers to the reproduction of audio data, the display of a still image, the reproduction of video, and the execution of an application program, and so on.

Furthermore, although an example in which the present invention is applied to a mobile terminal apparatus such as a mobile phone is described in the description of the aforementioned first to third embodiments, the present invention may be applied to a stationary terminal apparatus such as a personal computer.

Furthermore, although the mobile terminal apparatus 4 obtains the content 211 and the right 212 via the mobile communication network 2 such as the Internet in the description of the aforementioned first to third embodiments, one or more of the content 211 and the right 212 may be obtained via a recording medium that can be attached to the mobile terminal apparatus 4. In the same manner, in the description of the second embodiment, the mobile terminal apparatus 4 may obtain one or more of the priority information 213 and the priority information management information 214 via a recording medium that can be attached to the mobile terminal apparatus 4.

Furthermore, although the examples shown in FIG. 6A, FIG. 6B, and FIG. 6C are given as examples of the priority information management information 214 in the description of the aforementioned first to third embodiments, any one or a combination of two or more among the reproduction purpose, the content type, and the reproduction time may be used as the priority information management information 214.

Furthermore, the respective function blocks of the storage control unit 202, the right managing unit 203, the right selecting unit 204, the content reproducing unit 205, the reproduction information obtaining unit 206, the current time measuring unit 207, the transmitting and receiving unit 208, the data analyzing unit 209, and the priority information selecting unit 210, shown in FIG. 2 are implemented as an LSI 1100 which is a typical integrated circuit. These functions blocks may be individually configured as single chips or may be configured so that a part or all of the function blocks are included in a single chip.

FIG. 15 shows an example of an integrated circuit included in the mobile terminal apparatus 4 in the first embodiment. The LSI 1100 represents an example of the integrated circuit included in the mobile terminal apparatus 4. In other words, the LSI 1100 is an example of the range of function blocks that are implemented as an integrated circuit. Although an LSI is mentioned here, the integrated circuit can also be called an IC, a system LSI, a super LSI, and an ultra LSI, depending on differences in integration.

Furthermore, the method of circuit integration is not limited to LSIs, and implementation through a dedicated circuit or a general-purpose processor is also possible. A Field Programmable Gate Array (FPGA) which allows programming after LSI manufacturing or a reconfigurable processor which allows reconfiguration of the connections and settings of the circuit cells inside the LSI may also be used.

In addition, depending on the emergence of circuit integration technology that replaces LSI due to progress in semiconductor technology or other derivative technology, it is obvious that such technology may be used to integrate the function blocks. Possibilities in this regard include the application of biotechnology and the like.

Furthermore, the functions of each function block included in the mobile terminal apparatus 4 may be implemented through the execution of a program by a terminal apparatus including a CPU and a memory. Furthermore, the present invention may be implemented as a recording medium on which such program is recorded.

INDUSTRIAL APPLICABILITY

The present invention can be applied to a terminal apparatus, a right priority judging method, a program, and an integrated circuit, and particularly to a mobile terminal apparatus such as a mobile phone.

The invention claimed is:

1. A terminal apparatus which processes a copyright-protected content based on a plurality of rights that permit the processing of the copyright-protected content, said terminal apparatus comprising:
    a priority information selecting unit configured to select a piece of priority information associated with one processing condition of a plurality of processing conditions for the copyright-protected content to be processed, the piece of priority information being selected from among a plurality of pieces of priority information for determining a priority for each right of the plurality of rights;
    a right selecting unit configured to determine the priority of each right of the plurality of rights based on the selected piece of priority information, and to select a right, of the plurality of rights, having a highest priority, the right being selected according to the determined priority of each right;
    a content processing unit including a processor configured to process the copyright-protected content based on the selected right; and
    a priority information management information generating unit configured to generate priority information management information indicating associations between the plurality of pieces of priority information and the plurality of processing conditions for the copyright-protected content,
    wherein the plurality of rights includes a first right specifying a first processing time, which is a length of time for which the processing of the copyright-protected content is permitted, and a second right specifying a first processing count, which indicates a number of times for which the processing of the copyright-protected content is permitted,
    wherein the plurality of pieces of priority information includes (i) first priority information indicating that the first processing time has a higher priority than the first processing count, and (ii) second priority information indicating that the first processing count has a higher priority than the first processing time,
    wherein said priority information management information generating unit is configured to (i) calculate a second processing count by dividing the first processing time by a second processing time required for processing the copyright-protected content according to a first processing condition which is a processing condition of the plurality of processing conditions of the copyright-protected content, (ii) compare the first processing count and the second processing count, (iii) generate the priority information management information in which the first priority information is associated with the first processing condition, when the second processing count is greater than the first processing count, and (iv) generate the priority information management information in which the second priority information is associated with the first processing condition, when the second processing count is less than the first processing count, and
    wherein said priority information selecting unit is configured to select, according to the priority information management information and from among the plurality of pieces of priority information, the piece of priority information associated with the one processing condition of the plurality of processing conditions for the copyright-protected content to be processed.

2. The terminal apparatus according to claim 1,
    wherein said priority information selecting unit is configured to select the second priority information prior to a reproduction of the copyright-protected content by said content processing unit,
    wherein said right selecting unit is configured to select the second right using the second priority information,
    wherein said content processing unit is configured to process the copyright-protected content based on the selected second right,
    wherein said terminal apparatus further comprises a right updating unit configured to update the second right according to a state of the reproduction of the copyright-protected content by said content processing unit,
    wherein said priority information selecting unit is configured to re-select the first priority information after the reproduction of the copyright-protected content, when a reproduction time for the reproduction of the copyright-protected content by said content processing unit is shorter than a set time,
    wherein said right selecting unit is configured to re-select the first right using the first priority information, and
    wherein said right updating unit is configured to update the first right and to restore the second right to a state prior to being updated, according to the state of the reproduction of the copyright-protected content by said content processing unit.

3. The terminal apparatus according to claim 1, wherein said right selecting unit is configured to (i) determine, based on the first priority information, that the first right has a higher priority than the second right, when the first priority information is selected by said priority information selecting unit, and (ii) determine, based on the second priority information, that the second right has a higher priority than the first right, when the second priority information is selected by said priority information selecting unit.

4. The terminal apparatus according to claim 3, wherein said priority information selecting unit is configured to select the first priority information when a processing time for the copyright-protected content to be processed is the first processing time, and select the second priority information when the processing time for the copyright-protected content to be processed is the second processing time, which is longer than the first processing time.

5. The terminal apparatus according to claim 3,
wherein the one processing condition for the copyright-protected content indicates a processing purpose of the copyright-protected content, and
wherein said priority information selecting unit is configured to select the first priority information when the processing purpose of the copyright-protected content to be processed is for an incoming-message alert data, and to select the second priority information when the processing purpose of the copyright-protected content to be processed is a reproduction according to a user operation.

6. The terminal apparatus according to claim 3,
wherein the one processing condition for the copyright-protected content indicates a type of the copyright-protected content, and
wherein said priority information selecting unit is configured to select the first priority information when the type of the copyright-protected content to be processed is a still-image, and to select the second priority information when the type of the copyright-protected content to be processed is video or audio.

7. A right priority judging method for use with a terminal apparatus which processes a copyright-protected content based on a plurality of rights that permit the processing of the copyright-protected content, said right priority judging method comprising:
selecting a piece of priority information associated with a one processing condition of a plurality of processing conditions for the copyright-protected content to be processed, the piece of priority information being selected from among a plurality of pieces of priority information for determining a priority for each right of the plurality of rights;
determining the priority of each right of the plurality of rights based on the selected piece of priority information, and selecting a right, of the plurality of rights, having a highest priority, the right being selected according to the determined priority of each right;
processing the copyright-protected content based on the selected right; and
generating priority information management information indicating associations between the plurality of pieces of priority information and the plurality of processing conditions for the copyright-protected content,
wherein the plurality of rights includes a first right specifying a first processing time which is a length time for which the processing of the copyright-protected content is permitted, and a second right specifying a first processing count, which indicates a number of times for which the processing of the copyright-protected content is permitted,
wherein the plurality of pieces of priority information includes (i) first priority information indicating that the first processing time has a higher priority than the first processing count, and (ii) second priority information indicating that the first processing count has a higher priority than the first processing time,
wherein, in said generating of the priority information management information, (i) a second processing count is calculated by dividing the first processing time by a second processing time required for processing the copyright-protected content according to a first processing condition which is a processing condition of the plurality of processing conditions of the copyright-protected content, (ii) the first processing count and the second processing count are compared, (iii) the priority information management information in which the first priority information is associated with the first processing condition is generated when the second processing count is greater than the first processing count, and (iv) the priority information management information in which the second priority information is associated with the first processing condition is generated when the second processing count is less than the first processing count, and
wherein said selecting of the piece of priority information selects, according to the priority information management information and from among the plurality of pieces of priority information, the piece of priority information associated with the one processing condition of the plurality of processing conditions for the copyright-protected content to be processed.

8. A non-transitory computer-readable recording medium having a program recorded thereon, the program for processing a copyright-protected content based on a plurality of rights that permit the processing of the copyright-protected content and the program causing a computer to execute a right priority judging method comprising:
selecting a piece of priority information associated with one processing condition of a plurality of processing conditions for the copyright-protected content to be processed, the piece of priority information being selected from among a plurality of pieces of priority information for determining a priority for each right of the plurality of rights;
determining the priority of each right of the plurality of rights based on the selected piece of priority information, and selecting a right, of the plurality of rights, having a highest priority, the right being selected according to the determined priority of each right;
processing the copyright-protected content based on the selected right; and
generating priority information management information indicating associations between the plurality of pieces of priority information and the plurality of processing conditions for the copyright-protected content,
wherein the plurality of rights includes a first right specifying a first processing time, which is a length time for which the processing of the copyright-protected content is permitted, and a second right specifying a first processing count, which indicates a number of times for which the processing of the copyright-protected content is permitted,
wherein the plurality of pieces of priority information includes (i) first priority information indicating that the first processing time has a higher priority than the first processing count, and (ii) second priority information indicating that the first processing count has a higher priority than the first processing time,
wherein, in said generating of the priority information management information, (i) a second processing count is calculated by dividing the first processing time by a second processing time required for processing the copyrightht-protected content according to a first processing condition which is a processing condition of the plurality of processing conditions of the copyright-protected content, (ii) the first processing count and the second processing count are compared, (iii) the priority information management information in which the first priority information is associated with the first processing condition is generated when the second processing count is greater than the first processing count, and (iv) the priority information management information in which the second priority information is associated with the first processing condition is generated when the second processing count is less than the first processing count, and wherein said selecting of the piece of priority information selects, according to the priority information management information and from among the plurality of pieces of priority information, the piece of priority information associated with the one processing condition of the plurality of processing conditions for the copyright-protected content to be processed.

9. An integrated circuit which processes a copyright-protected content based on a plurality of rights that permit the processing of the copyright-protected content, said terminal apparatus comprising:

a priority information selecting unit configured to select a piece of priority information associated with one processing condition of a plurality of processing conditions for the copyright-protected content to be processed, the piece of priority information being selected from among a plurality of pieces of priority information for determining a priority for each right of the plurality of rights;

a right selecting unit configured to determine the priority of each right of the plurality of rights based on the selected piece of priority information, and to select a right, of the plurality of rights, having a highest priority, the right being selected according to the determined priority of each right;

a content processing unit including a processor configured to process the copyright-protected content based on the selected right; and a priority information management information generating unit configured to generate priority information management information indicating associations between the plurality of pieces of priority information and the plurality of processing conditions for the copyright-protected content, wherein the plurality of rights includes a first right specifying a first processing time, which is a length of time for which the processing of the copyright-protected content is permitted, and a second right specifying a first processing count, which indicates a number of times for which the processing of the copyright-protected content is permitted, wherein the plurality of pieces of priority information includes (i) first priority information indicating that the first processing time has a higher priority than the first processing count, and (ii) second priority information indicating processing time has higher priority than the processing count, and the second priority indicating that the first processing count has a higher priority than the first processing time, and wherein said priority information management information generating unit is configured to (i) calculate a second processing count by dividing the first processing time by a second processing time required for processing the copyright-protected content according to a first processing condition which is a processing condition of the plurality of processing conditions of the copyright-protected content, (ii) compare the first processing count and the second processing count, (iii) generate the priority information management information in which the first priority information is associated with the first processing condition, when the second processing count is greater than the first processing count, and (iv) generate the priority information management information in which the second priority information is associated with the first processing condition, when the second processing count is less than the first processing count, and wherein said priority information selecting unit is configured to select, according to the priority information management information and from among the plurality of pieces of priority information, the piece of priority information associated with the one processing condition of the plurality of processing conditions for the copyright-protected content to be processed.

* * * * *